(12) United States Patent
Kasahara et al.

(10) Patent No.: US 7,713,606 B2
(45) Date of Patent: May 11, 2010

(54) ADHESIVE PRODUCT AND TRANSFERRING INSTRUMENT

(75) Inventors: Hiroyuki Kasahara, Osaka (JP); Kazushige Kawashita, Osaka (JP); Yoshiaki Urahama, Osaka (JP)

(73) Assignee: Kokuyo S&T Co., Ltd. (JP)

( * ) Notice: Subject to any disclaimer, the term of this patent is extended or adjusted under 35 U.S.C. 154(b) by 79 days.

(21) Appl. No.: 11/311,158

(22) Filed: Dec. 20, 2005

(65) Prior Publication Data

US 2006/0165936 A1    Jul. 27, 2006

(30) Foreign Application Priority Data

Jan. 25, 2005   (JP)   ............... P2005-017537

(51) Int. Cl.
 *B32B 9/00*   (2006.01)
 *B32B 33/00*  (2006.01)
 *B44C 1/17*   (2006.01)

(52) U.S. Cl. .............. 428/40.1; 428/41.5; 428/42.1; 428/195.1; 428/906

(58) Field of Classification Search ............. 428/40.1, 428/41.5, 42.1, 195.1, 201, 202, 906
 See application file for complete search history.

(56) References Cited

U.S. PATENT DOCUMENTS

| | | | |
|---|---|---|---|
| 3,741,786 A | 6/1973 | Torrey | |
| 5,866,249 A * | 2/1999 | Yarusso et al. | 428/41.8 |
| 6,084,010 A | 7/2000 | Baetzold et al. | |
| 2005/0084641 A1 * | 4/2005 | Downs et al. | 428/42.3 |
| 2005/0182182 A1 * | 8/2005 | Morishita et al. | 524/515 |
| 2005/0255275 A1 * | 11/2005 | Downs et al. | 428/42.3 |

FOREIGN PATENT DOCUMENTS

| | | |
|---|---|---|
| EP | 0381511 | 8/1990 |
| JP | 2000 025780 | 1/2000 |
| JP | 2001-271041 | 10/2001 |

OTHER PUBLICATIONS

Kokuyo catalog, Office Supplies Edition, p. 674, dated 2005.

* cited by examiner

*Primary Examiner*—Patricia L Nordmeyer
(74) *Attorney, Agent, or Firm*—Banner & Witcoff, Ltd.

(57) ABSTRACT

An adhesive product which has excellent glue cutting performance and provides an excellent finish to the pasted portion while effectively maintaining security is provided. An adhesive layer 10 is formed through pattern application, where an adhesive 100 is intermittently placed on the surface of a film 12, so that a broken paper phenomenon, such that the surface layer portion of a flap F1 or the vicinity of opening F2 adheres to the surface of the adhesive layer 10, and a white envelope F is ripped in the direction of the thickness, can be caused when a peeling movement for peeling the flap F1 from a state where the white envelope F is sealed via the adhesive layer 10.

20 Claims, 10 Drawing Sheets

Fig.5
(a) first pressing movement
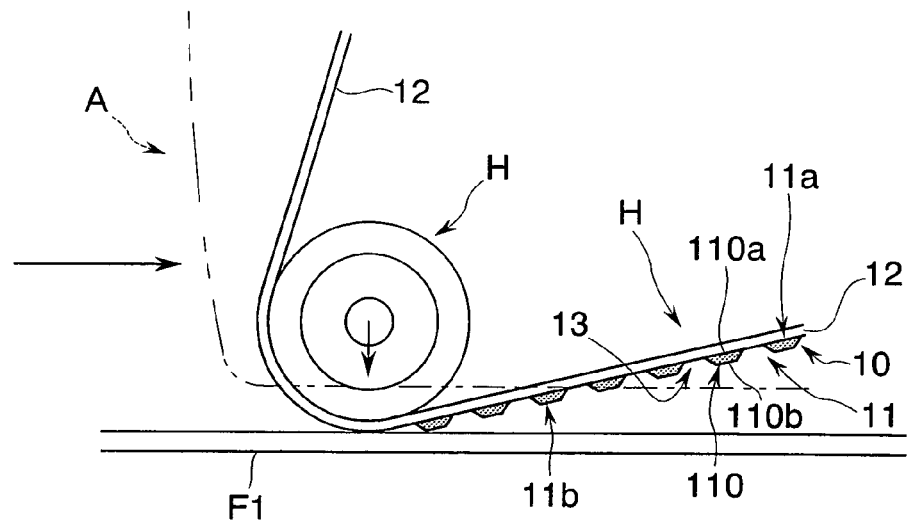
(b)
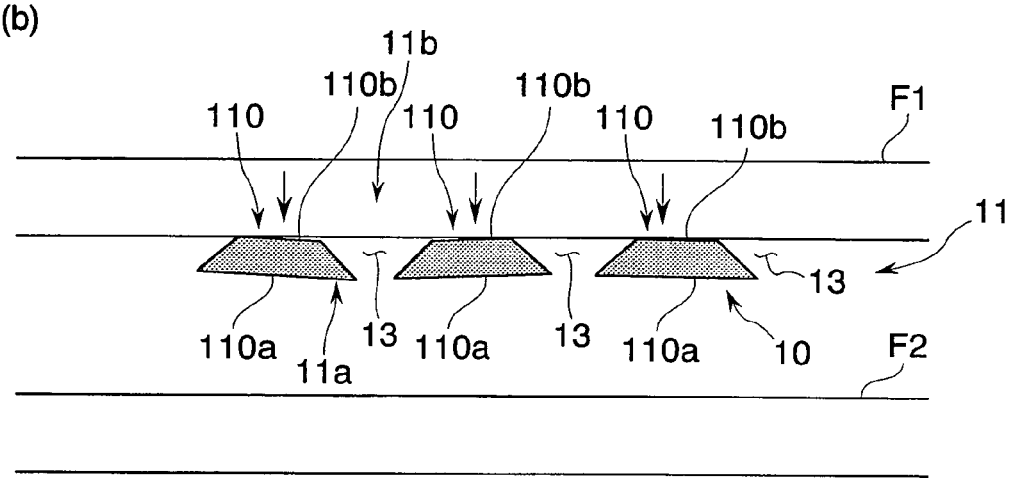
(c) second pressing movement
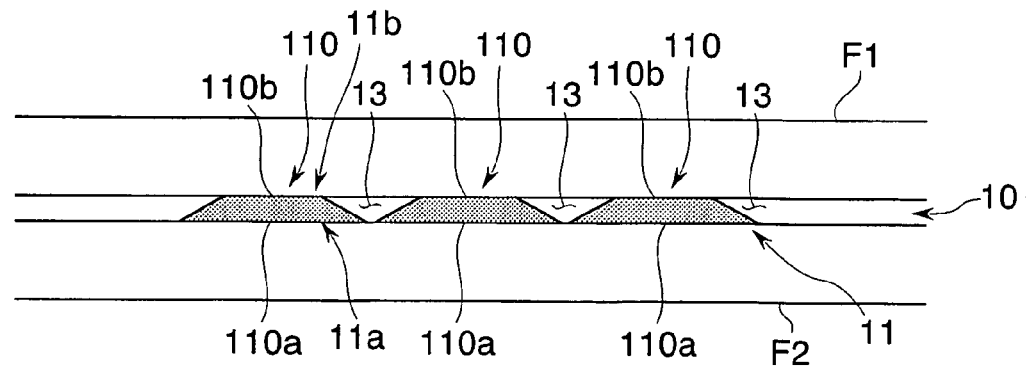

Fig.6
dots
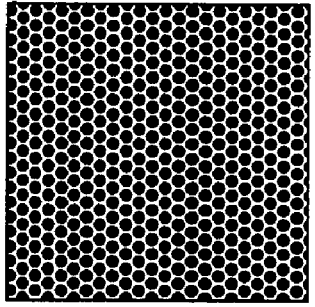
fine dots
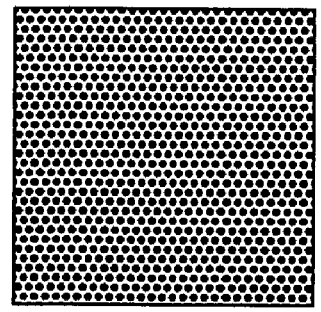
dots ⌀ 2
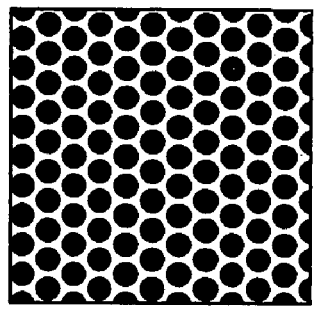
dots ⌀ 2 + mesh
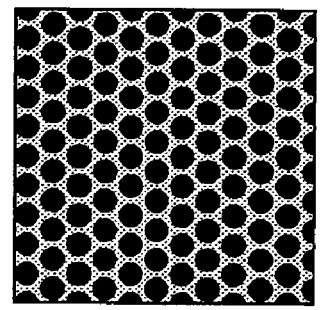
Fig.7
grate
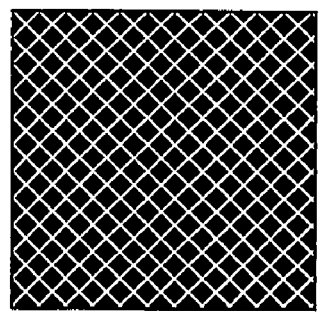
flat grate
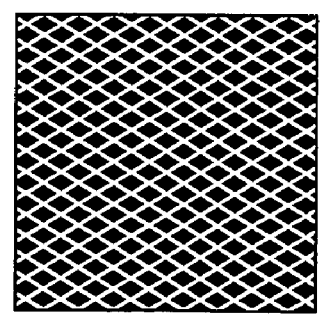

Fig.8
gingko          bricks          fine hexagons
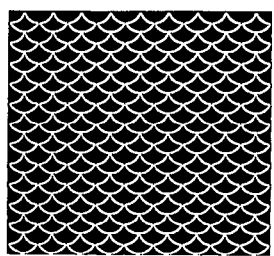 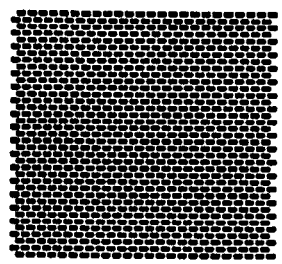 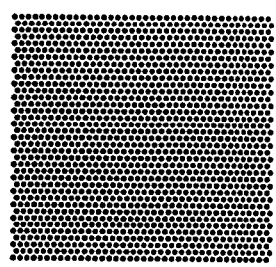
Fig.9
tire          big waves          lateral stripes
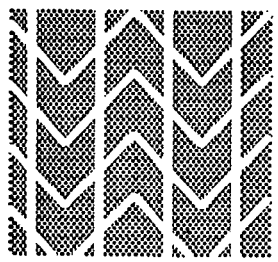  

Fig.11
(a)
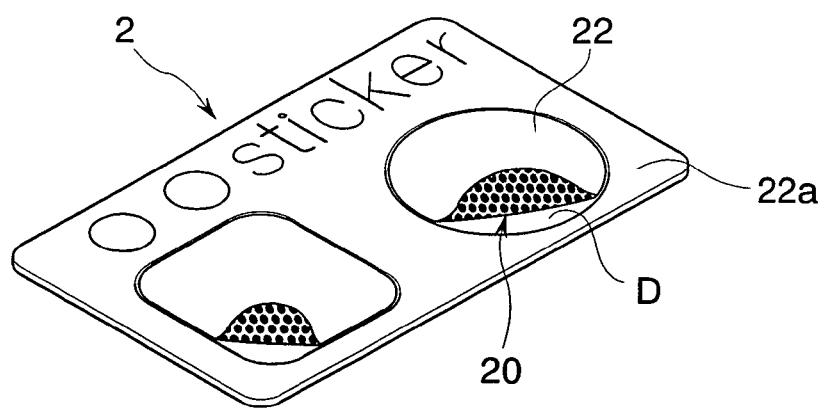
(b)
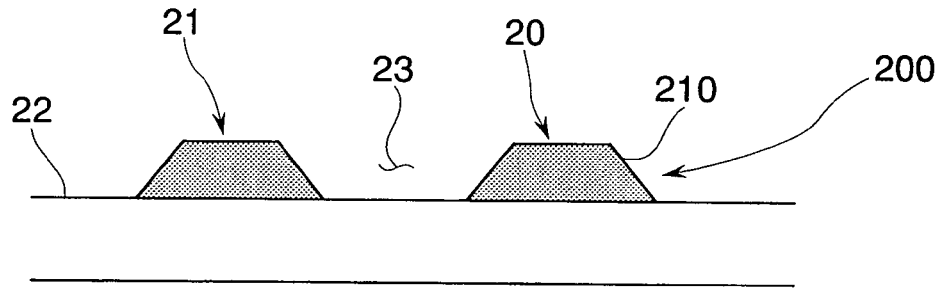
(c)
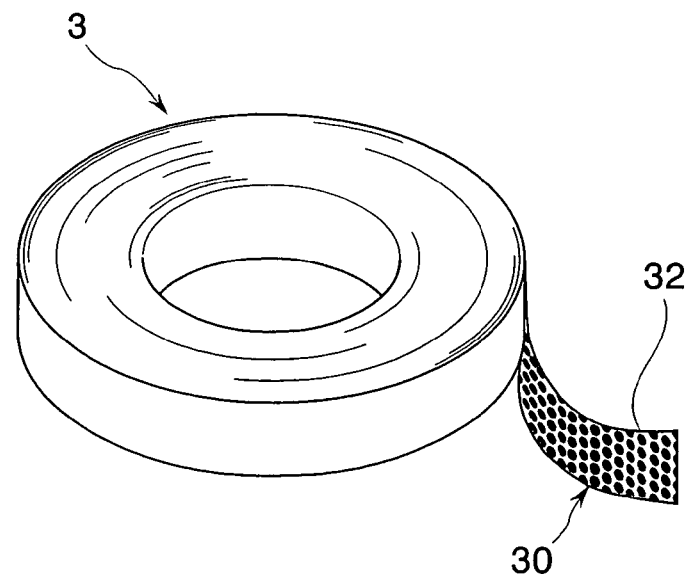

Fig. 12
(a) damaged paper
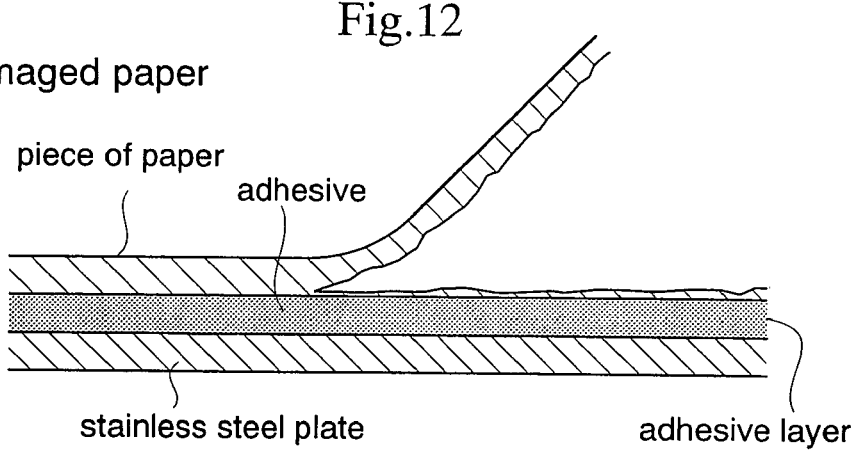
(b) peeling from the interface
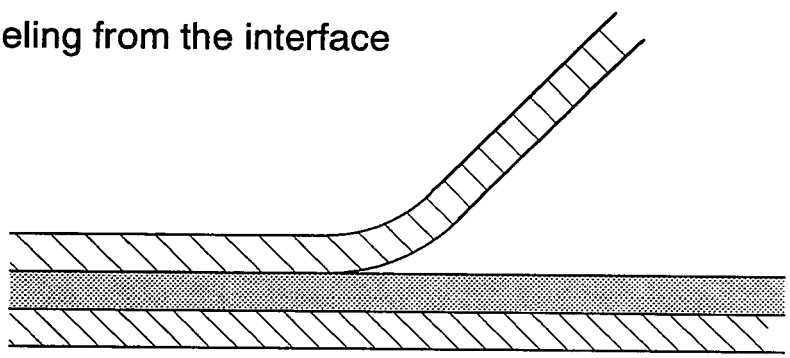
(c) peeling with aggregation
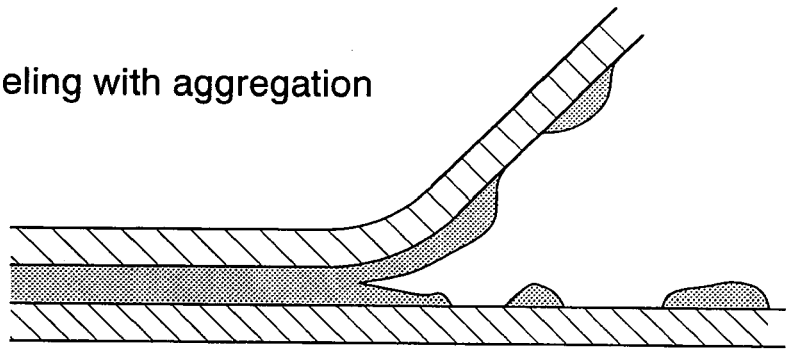
(d) separation
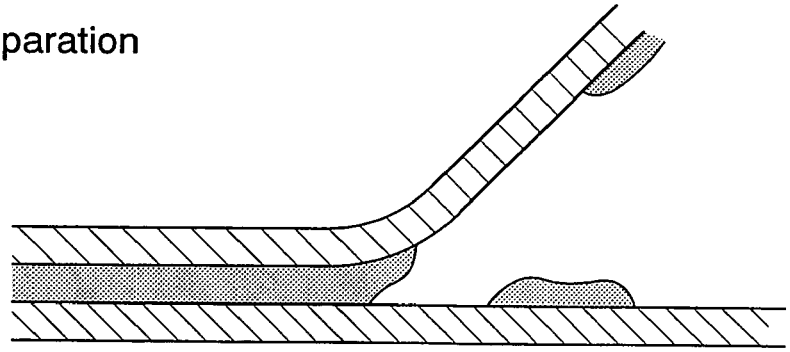

ADHESIVE PRODUCT AND TRANSFERRING INSTRUMENT

BACKGROUND OF THE INVENTION

1. Field of the Invention

The present invention relates to an adhesive product for sealing paper articles such as envelopes.

2. Description of the Related Art

Various types of conventional adhesive products where an adhesive layer is provided on a base are used in many applications in office work. Such adhesive products are roughly categorized into two types. One is adhesive products that work in such a manner that a base is pasted to paper articles as a support in a state where the base and an adhesive layer have been stuck together in advance. As concrete examples of such products, adhesive tapes and stickers can be cited. The other is adhesive products which are formed in such a manner that abase is provided so as to be removable from an adhesive layer, and thus, two objects to be stuck together can be stuck together via the adhesive layer. As concrete examples of such products, pressure sensitive transferring type adhesive tapes (hereinafter referred to as pressure sensitive transferring tapes) which are commercially available as so-called "tape glue" can be cited. Such pressure sensitive transferring tapes are generally mounted in a transferring instrument in a state of being wound into a roll, and are handled in such a manner that the glue can be appropriately transferred for only a desired length.

For both of the above described adhesive products, it is the glue cutting performance at the time of handling that is considered to be the most important factor, together with adhesiveness. As an effective technique for improving this glue cutting performance, a technique for intermittently applying an adhesive layer to a base, so-called pattern application, is widely used, particularly for pressure sensitive transferring tapes. In addition, the fact that air escapes from gaps between the adhesive when an adhesive layer is transferred, and thus, air that is trapped between the adhesive layer and the object to be pasted can be effectively prevented from causing bubbles and wrinkles, and thereby causing poor appearance, can be cited as an additional advantage of pattern application.

However, the fact that the ratio of the area of the adhesive to the area where it is applied and the amount of application are small, thereby deteriorating a sealing property, in comparison with those when an adhesive is applied to the entire surface of a base can be cited as a disadvantage of such pattern application.

Therefore, a method for improving the glue cutting performance while an adhesive is applied to the entire surface of a base has been developed. A configuration where an adhesive layer that has been applied to the entire surface of a base is embossed, and thereby, glue can be easily cut in portions having a small thickness in the adhesive layer can be cited as an example (see, for example, Japanese Unexamined Patent Publication 2001-271041 (see, for example, Tables 1 and 2)).

Meanwhile, the performance required for an adhesive product greatly differs depending on the application of the adhesive product. Many adhesive products which satisfy the performance requirements of an adhesive being removable without damaging an object to be pasted and without remaining on the object to be pasted have been developed so far (see, for example, "Kokuyo 2005, Office Supplies Edition," Kokuyo Co., Ltd. December 2004, p. 674).

SUMMARY OF THE INVENTION

As a completely different idea from the above described case, where an object of the adhesive is not to damage the object to be pasted, there are cases where it is necessary to damage the surface layer of paper without failure when the object to be pasted is a paper article, and a peeling movement is carried out in order to attempt to peel the adhesive product or the adhesive from the paper article.

Such cases are described by citing concrete examples below. In the case where an important document, such as a document containing personal information, is transmitted in an envelope, it is necessary, from the point of view of security, that is, protection or safeguarding of personal information, to seal the envelope in such a manner that the recipient can clearly confirm whether or not the envelope has been opened by a third party. In particular, it becomes absolutely essential to seal and shut an envelope in such a manner that the surface of the envelope is damaged when an attempt is made to peel the adhesive layer. In addition, pages are bound using adhesive products in book binding for, for example, notebooks, diaries and publications, and it is important, from the point of view of preventing forgery or counterfeiting of the contents, to make it impossible to switch or insert pages after binding. In this case also, traces left by the separation of pages are left on pages, that is to say, paper articles after binding, so that forgery and counterfeiting can be prevented.

In the following, in the present specification, such a state where the surface of a paper article is damaged is referred to as damaged paper. In addition, ripping of a paper article in the direction of the thickness due to the adhesion of the surface layer of the paper article to the adhesive when the adhesive layer of an adhesive product is peeled is referred to as damaged paper phenomenon.

That is to say, the idea of damaged paper being a standard of performance for clearly leaving a trace on the paper article where an adhesive product has been peeled through a peeling movement from an object to be pasted after it has been pasted can be newly cited.

Conventional adhesive products as those described above, however, may damage weak paper, and it is not considered that a variety of types of paper articles which are usually utilized should be damaged, and in particular, adhesiveness is not designed taking into consideration that high quality paper that is used when storing important documents, and thick paper such as that of white envelopes, of which the surface strength is higher than that of high quality paper, must be damaged without failure, and therefore, the user cannot presently use such products with peace of mind for applications where an important document, as described above, is put into an envelope which is then sealed.

In addition, in the case where an important document is sealed, the appearance should be finished appropriately, without forming wrinkles or bubbles in the sealed/shut portion, according to common sense, and therefore, adhesive products are required to have performance for making the formation of bubbles and wrinkles difficult in the sealed portion, in addition to performance for sealing that is sufficiently high to cause paper to be damaged and performance for glue cutting.

Therefore, in consideration of the disadvantages described above, the present invention provides an adhesive product which can effectively maintain security and provides excellent performance of glue cutting, as well as an excellent finish in the sealed portion.

In order to achieve the above described object, the present invention provides the following means. That is to say, an adhesive product according to the present invention is an adhesive product which has an adhesive layer having an adhesive and a base for supporting the above described adhesive so that at least a paper article can be pasted to another member via the above described adhesive layer, characterized in that the above described adhesive layer is formed in such a manner that the above described adhesive is intermittently placed on the surface of the above described base, and the adhesive product is formed in such a manner that a damaged paper phenomenon where a surface layer portion of the above described paper article is attached to the surface of the above described adhesive layer and the above described paper article is ripped in the direction of the thickness can be caused when a peeling movement is carried out in order to peel the above described other member from the above described paper article from a state where the above described paper article and the above described other member are pasted together via the above described adhesive layer.

Here, as the adhesive, a variety of materials such as acrylic materials, rubber based materials, silicone based materials, rosin based materials and urethane based materials can be used. In addition, the above described other member may be made of any material that can be pasted to the adhesive, and may of course be made of the same type as the above described paper article, a type of paper that is different from the above described paper article or a material other than paper. Furthermore, the base and the adhesive layer may or may not be pasted together. Concretely, a pressure sensitive transferring tape of which the components are not included in the above described paper article or the above described other member can be cited as an example that is formed in such a manner that the base can be removed from the adhesive layer. In addition, stickers and adhesive tapes correspond to the examples of the adhesive products according to the present invention which are formed in such a manner that the main body of the tape, which is the base, can not be removed from the adhesive layer.

In the configuration as described above, the adhesive layer can be intermittently placed between a paper article and another member, and thereby, the paper article and the member can be appropriately pasted together without including extra air, which has escaped from portions where the adhesive does not exist at the time of pasting of the paper article and the member. In addition, when a peeling movement is carried out so as to peel the adhesive from the paper article, a damaged paper phenomenon occurs causing the paper article to be in a state where the paper articles ripped in the direction of the thickness so as not to be repairable, and therefore, a trace where the adhesive product had once been pasted can be inevitably left on the paper article. Thus, when such an adhesive article is used, for example, for sealing an envelope, the envelope can be precisely sealed providing an excellent appearance and at the same time sealing having a high security can be carried out in such a manner that a trace where the envelope was opened can be left without failure. In addition, when this adhesive product is utilized for the application of bookbinding, forgery or counterfeiting after binding can be effectively prevented.

In addition, it is desirable for the adhesive product according to the present invention to be formed so that a damaged paper phenomenon can be caused to high quality paper which is widely used in applications in office work and in applications for publishing from among a variety of paper articles. Furthermore, it is desirable for the adhesive product to be formed so that a damaged paper phenomenon can be caused to white envelopes which are stronger than high quality paper and are generally used to store or send important documents.

As described above, a variety of types of adhesives can be used as the adhesive that forms the adhesive product according to the present invention, and acrylic adhesives can be cited as an adhesive that can be precisely and efficiently applied in accordance with a variety of methods such as screen printing and gravure printing.

In addition, it is assumed that adhesives that include the following acrylic triblock copolymers have excellent resistance to heat and weather which is required during a manufacturing process or during storage as well as excellent coagulating properties and adhesiveness from among acrylic adhesives. Concretely, acrylic triblock copolymers are triblock copolymers represented by formula: A-B-A or formula: A-B-C wherein A, B and C indicate polymer blocks which are different from each other, A comprises alkyl methacrylate units, B comprises alkyl acrylate units, and C comprises alkyl acrylate units or alkyl methacrylate units.

The details are described as follows: From the points of view of gaining an adhesive composition having a high level of uniformity and excellent resistance to heat and weather in order to gain an adhesive layer having excellent coagulating properties, it is preferable in the above described acrylic triblock copolymers for at least one of polymer blocks A, B and C to be made of the above described alkyl acrylate units and/or alkyl methacrylate units, it is more preferable for all of polymer blocks A, B and C to be made of alkyl acrylate units and/or alkyl methacrylate units, and in particular, it is most preferable for polymer block A to be made of alkyl methacrylate, for polymer block B to be made of alkyl acrylate and for polymer block C to be made of alkyl methacrylate or alkyl acrylate. As concrete examples of these particularly preferable acrylic triblock copolymers, triblock copolymers having structures represented by formulas: A-B-A and A-B-C such as poly(methyl methacrylate)-b-polyacrylate n-butyl-b-poly (methyl methacrylate), poly(methyl methacrylate)-b-polyacrylate n-butyl-b-poly(methyl acrylate) and poly(methyl methacrylate)-b-polyacrylate n-butyl-b-poly(ethyl acrylate) can be cited. From among these, it is more desirable for the triblock copolymer to have a structure represented by poly (methyl methacrylate)-b-polyacrylate n-butyl-b-poly(methyl methacrylate).

Though the weight-average molecular weights of polymer block A, polymer block B and polymer block C in the above described triblock copolymer are not necessarily limited, it is generally preferable for each of them to be in a range from 3,000 to 500,000, and it is more preferable for each of them to be in a range from 3,000 to 300,000. In addition, though the weight-average molecular weight of the entirety of the triblock copolymer is not necessarily limited, it is generally preferable for it to be in a range from 10,000 to 1,000,000, it is more preferable for it to be in a range from 30,000 to 500,000 and it is most preferable for it to be in a range from 40,000 to 200,000.

The above described acrylic adhesive may be made of solely the above described triblock copolymer and another component may be appropriately mixed if necessary. Though the component that may be arbitrarily mixed to the acrylic adhesive is not particularly limited, an acrylic diblock copolymer, a tackifier and the like can be cited from the point of view of gaining an adhesive having a high level of uniformity and excellent resistance to heat and weather and which is compatible with the above described triblock copolymer.

The acrylic diblock copolymer is described in detail as follows. The diblock copolymers which are represented by the following general formula (I):

$$X—Y \quad (I)$$

wherein X indicates a polymer block primarily comprising alkyl methacrylate units having an alkyl group with 1 to 4 carbon atoms or an alkyl group with a ring structure, and Y indicates a polymer block primarily comprising alkyl acrylate units having an alkyl group with 1 to 20 carbon atoms and/or alkyl methacrylate units having an alkyl group with 5 to 20 carbon atoms, can be cited. The weight-average molecular weight (Mw) of the polymer block X is 1000 to 8000 and the ratio of the mass of the polymer block X to the mass of polymer block Y, the mass ratio of X/Y, is in a range of 1/99 to 10/90.

In addition, it is preferable for the diblock copolymer to have polymer block X that is primarily made of alkyl methacrylate units having an alkyl group with 1 to 4 carbon atoms, and polymer block Y that is primarily made of alkyl acrylate units having an alkyl group with 1 to 20 carbon atoms.

That is to say, the diblock copolymers that are adopted according to the present invention are X-Y type diblock copolymers represented by the above described general formula (I), and in general formula (I), X indicates a polymer block primarily made of alkyl methacrylate units having an alkyl group with 1 to 4 carbon atoms or an alkyl group having a ring structure and Y indicates a polymer block primarily made of alkyl acrylate having an alkyl group with 1 to 20 carbon atoms and/or alkyl methacrylate units having an alkyl group with 5 to 20 carbon atoms, and it is preferable from the point of view of adhesion performance for the diblock copolymer of the above described general formula (I) to have polymer block X that is primarily made of alkyl methacrylate having an alkyl group with 1 to 4 carbon atoms and polymer block Y that is primarily made of alkyl acrylate units having an alkyl group with 1 to 20 carbon atoms.

As examples of the alkyl group with 1 to 4 carbon atoms in the above described polymer block X, a methyl group, an ethyl group, an n-propyl group, an isopropyl group, an n-butyl group, a sec-butyl group, an isobutyl group, a tert-butyl group and the like can be cited, and as examples of the alkyl group having a ring structure, a cyclopropyl group, a cyclobutyl group, a cyclopentyl group, a cyclohexyl group, a cycloheptyl group, an isobornyl group and the like can be cited. These groups may have a substitute group and as for examples of such a substitute group, alkoxy groups such as a methoxy group, an ethoxy group, an n-propoxy group, an isopropoxy group and a tert-butoxy group, amino groups such as an N,N-dimethyl amino group and an N, N-diethyl amino group, and halogen atoms such as chlorine, bromine, and fluorine can be cited.

Though monomers which form alkyl methacrylate having an alkyl group with 1 to 4 carbon atoms or an alkyl group with a ring structure are not necessarily limited, methylmethacrylate, ethyl methacrylate, isopropyl methacrylate, sec-butyl methacrylate, isobutyl methacrylate, tert-butyl methacrylate, cyclohexyl methacrylate, isobornyl methacrylate, 2-methoxyethyl methacrylate, 2-(N,N-dimethylamino)ethyl methacrylate and trifluoromethyl methacrylate can be cited as examples, and one or more types of these can be utilized.

In the case where polymer block X is a polymer block which comprises alkyl methacrylate units having an alkyl group that has no less than 5 carbon atoms and does not have a ring structure, the glass transition temperature (Tg) of polymer block X becomes low, and therefore, coagulating properties and resistance to heat become poor, which is not preferable, when used as a component that is mixed into an adhesive. Therefore, it is preferable for the glass transition temperature (Tg) of polymer block X to be no less than +50° C., and it is more preferable for it to be no less than +70° C.

Though the polymer block that is denoted as X in the above described general formula (I) can contain only alkyl methacrylate units as described above, only a small ratio (usually no greater than 20 mass % relative to the total amount of polymer block X), which is in a range where the effects of the present invention are not lost, of monomer units other than alkyl methacrylate units having an alkyl group with 1 to 4 carbon atoms or an alkyl group with a ring structure can be contained. As examples of such other monomer units, components originated from monomers including: alkyl methacrylate with no less than 5 carbon atoms, such as 2-ethyl hexyl methacrylate and dodecyl methacrylate; alkyl acrylate, such as methyl acrylate, n-butyl acrylate and t-butyl acrylate; methacrylate ester other than alkyl methacrylate, such as trimethylsilyl methacrylate; acrylate ester other than alkyl acrylate, such as trimethylsilyl acrylate; methacrylamide such as methacrylamide, N-methyl methacrylamide, N-ethyl methacrylamide, N-isopropyl methacrylamide, N, N-dimethyl methacrylamide and N,N-diethyl methacrylamide; acryl amide such as acryl amide, N-methyl acryl amide, N-ethyl acryl amide, N-isopropyl acryl amide, N,N-dimethyl acryl amide and N,N-diethyl acryl amide; vinyl based monomers having a carboxyl group, such as a methacrylic acid, an acrylic acid, a crotonic acid, a maleic acid, an anhydrous maleic acid and a fumaric acid; aromatic vinyl based monomers such as styrene, α-methyl styrene and p-methyl styrene; conjugate diene based monomers such as butadiene and isoprene; olefins such as ethylene and propylene; and lactones such as ε-caprolactone and valerolactone, can be cited.

In addition, in polymer block Y, as examples of the above described alkyl group with 1 to 20 carbon atoms, a methyl group, an ethyl group, an n-propyl group, an isopropyl group, an n-butyl group, an isobutyl group, a sec-butyl group, a tert-butyl group, a 2-methyl butyl group, a 3-methyl butyl group, an n-octyl group, a 2-ethyl hexyl group, an isononyl group, a dodecyl group, a tridecyl group and a stearyl group can be cited. In addition, as examples of the alkyl group with 5 to 20 carbon atoms, n-pentyl group, 2-methylbutyl group, 3-methylbutyl group, n-octyl group, 2-ethylhexyl group, dodecyl group, stearyl group and the like can be cited. These groups may have a substitute group and as examples of such a substitute group, alkoxy groups such as a methoxy group, an ethoxy group, an n-propoxy group, an isopropoxy group and a tert-butoxy group; amino groups such as an N, N-dimethyl amino group and an N,N-diethyl amino group; and halogen atoms such as chlorine, bromine and fluorine, can be cited.

Though the monomers that form alkyl acrylate units having an alkyl group with 1 to 20 carbon atoms are not necessarily limited, methyl acrylate, ethyl acrylate, n-propyl acrylate, isopropoyl acrylate, n-butyl acrylate, isobutyl acrylate, sec-butyl acrylate, tert-butyl acrylate, n-hexyl acrylate, 2-ethyl hexyl acrylate, dodecyl acrylate, tridecyl acrylate, stearyl acrylate, 2-methoxy ethyl acrylate, 2-(N,N-dimethyl amino) ethyl acrylate, trifluoromethyl acrylate and trimethoxysilyl propyl acrylate, can be cited as examples, and one or more types of these can be utilized. In addition, though the monomers that form alkyl methacrylate units having an alkyl group with 5 to 20 carbon atoms are not necessarily limited, n-pentyl methacrylate, n-hexyl methacrylate, 2-ethyl hexyl methacrylate, dodecyl methacrylate, tridecyl methacrylate, stearyl methacrylate, 2-methoxy pentyl methacrylate, 2-(N,N-dimethyl amino) pentyl methacrylate, perfluoropentyl methacrylate and 2-trimethoxysilyl pentyl methacrylate, can be cited as examples, and one or more types of these can be utilized.

In the case where polymer block Y is a polymer block made of alkyl methacrylate units having an alkyl group with 1 to 4 carbon atoms, the glass transition temperature (Tg) of polymer block Y becomes high, and therefore, it becomes hardened and the adhesiveness is reduced, which is not preferable, when used as a component that is mixed into an adhesive. Therefore, it is preferable for the glass transition temperature (Tg) of polymer block Y to be less than +50° C., it is more preferable for it to be no higher than +10° C. and it is most preferable for it to be no higher than −20° C.

Though the polymer block that is denoted as Y in the above described general formula (I) can contain only alkyl acrylate having an alkyl group with 1 to 20 carbon atoms and/or alkyl methacrylate units having an alkyl group with 5 to 20 carbon atoms, a small ratio (no greater than 20 mass % relative to the total amount of polymer block Y) in a range where the effects of the present invention are not lost, of monomer units other than alkyl acrylate having an alkyl group with 1 to 20 carbon atoms and/or alkyl methacrylate units having an alkyl group with 5 to 20 carbon atoms can be contained. As examples of such monomer units, components originated from monomers including: alkyl acrylate having an alkyl group of with no smaller than 21 carbon atoms; alkyl methacrylate having an alkyl group with 1 to 4 carbon atoms; alkyl methacrylate having an alkyl group with no less than 21 carbon atoms; ester methacrylate other than alkyl ester such as trimethylsilyl methacrylate; ester acrylate other than alkyl ester such as trimethylsilyl acrylate; methacrylamide such as methacrylamide, N-methyl methacrylamide, N-ethyl methacrylamide, N-isopropyl methacrylamide, N,N-dimethyl methacrylamide and N,N-diethyl methacrylamide; acryl amide such as such as acrylamide, N-methyl acrylamide, N-ethyl acrylamide, N-isopropyl acryl amide, N,N-dimethyl acryl amide and N,N-diethyl acryl amide; vinyl based monomers having a carboxyl group, such as a methacrylic acid, an acrylic acid, a crotonic acid, a maleic acid, an anhydrous maleic acid and a fumaric acid; aromatic vinyl based monomers such as styrene, α-methyl styrene and p-methyl styrene; conjugate diene based monomers such as butadiene and isoprene; olefins such as ethylene and propylene; and lactones such as ε-caprolactone and valerolactone, can be cited.

The diblock copolymer represented by the above described general formula (I) may have a functional group such as a hydroxyl group, a carboxyl group, an anhydrous acid group, an amino group and a trimethoxysilyl group in a side chain of the molecule or at a terminal of the main chain of the molecule, if necessary, as long as the effects of the present invention are not lost.

Diblock copolymers such as that shown in the above described X—Y are made of a "hard block" and a "soft block" and in liquid form having fluidity in a temperature range of no lower than, for example, 100° C., which is very easy to handle and from such points of view, it is necessary for the weight-average molecular weight (Mw) of polymer block X in the diblock copolymers which satisfies the above described general formula (I) to be 1,000 to 8,000, it is preferable for it to be 2,000 to 6,000 from the point of view of gaining an adhesive composition having excellent adhesiveness, and it is more preferable for it to be 3,000 to 5,000. In the case where the weight-average molecular weight (Mw) of polymer block X is greater than 8,000, the gained diblock copolymer becomes a rice cake form which is not easy to handle during manufacturing and is hard to handle in the mixture process with other components such as a triblock copolymer, and thus, this is not preferable. In addition, the viscosity of the composition that contains the diblock copolymer becomes high at the time of melting, and therefore, this is also not preferable when using as an adhesive composition. Meanwhile, in the case where the weight-average molecular weight (Mw) is smaller than 1,000, coagulating properties are greatly reduced, and therefore, it is not preferable for polymer block X to be used as a component to be mixed into an adhesive.

In addition, in the diblock copolymer represented by the above described general formula (I), in the case where the ratio of the total mass of the polymer block represented by X is too small relative to the total mass of the polymer block which is used as the reference, coagulating properties of the gained block copolymer become poor and viscosity properties, such as holding pressure (shear creep intensity), of the gained adhesive composition tend to be reduced. Contrarily, in the case where the ratio of the total mass of the polymer block represented by X is too great, the gained block copolymer tends to lack viscosity properties (in particular adhesiveness) when used as an adhesive composition. Thus, it is necessary for the ratio of the mass of polymer block X to the mass of polymer block Y, the mass ratio of X/Y, that are included in the diblock copolymer of the present invention to be in a range from 1/99 to 10/90, and it is preferable for it to be in a range from 5/95 to 10/90.

In addition, it is preferable for the ratio (Mw/Mn) of the weight-average molecular weight (Mw) of polymer block X in the above described diblock copolymer to the number-average molecular weight (Mn) to be no greater than 1.5 from the point of view of making coagulating properties excellent when used as a component to be mixed into an adhesive, and it is more preferable for it to be 1.01 to 1.3.

Furthermore, it is preferable for the above described acrylic adhesive to include a tackifier in order to make it easy to increase or adjust tackiness, adhesiveness, holding pressure and the like. Though the tackifier that can be mixed is not particularly limited, rosin derivatives, such as rosin ester, rubber rosin, tall oil rosin, hydrogenated rosin ester, maleic modified rosin and disproportionated rosin ester; terpene based resins such as terpene phenol resins, resins of which the main component is α-pinene, β-pinene, limonene or the like; (hydrogenated) petroleum resins, coumarone-indene resins, hydrogenated aromatic copolymers, styrene based resins, phenol based resins and xylene based resins, can be cited as examples, and one or more types of these can be utilized.

Here, though the mixture ratios of the diblock copolymer, the triblock copolymer and the tackifier can be appropriately selected in accordance with the application of the adhesive product, the type of the object to be pasted and the like, and are not particularly limited, it is preferable that the amount of the other polymers is 10-10,000 pts. mass, and that of the tackifier is 0-10,000 pts. mass, relative to 100 pts. mass of the diblock copolymer, and it is more preferable that the amount of the other polymers is 10-5,000 pts. mass, and that of the tackifier is 0-5,000 pts. mass, relative to 100 pts. mass of the diblock copolymer.

In addition, it is preferable for the thickness of the adhesive layer to be set to 10 μm to 100 μm in order for the adhesive to be precisely and efficiently applied to the base while providing a formation that can cause a damaged paper phenomenon which ever method from among the above described variety of printing methods for applying the above described acrylic adhesive to a base is adopted during the process for manufacturing the adhesive product according to the present invention. Here, in the case where the thickness is no greater than 10 μm, application to a base without failure becomes difficult, while in the case where the thickness is no less than 100 μm, cost becomes high due to a large amount of application of the adhesive or paper cannot be broken at the time of the peeling movement due to the occurrence of coagulation loss of the adhesive which is caused by the reduced coagulating properties of the adhesive. Thus, taking the ease of application and the manufacturing cost into consideration as described above, it is desirable for the preferable thickness to be set to 15 μm to 80 μm and for the more preferable thickness to be set to 30 μm to 60 μm.

In addition, in order to make the glue cutting properties excellent while causing a damaged paper phenomenon, the above described adhesive layer has adhesive portions made of the above described acrylic adhesive and a gap portion intervening between the adhesive portions, and it is desirable for the ratio of the application area occupied by said adhesive portions to be set to 18% to 94%. Here, in the case where the ratio of the application area is no greater than 18%, the force for holding paper articles becomes weak, and thus, a damaged paper phenomenon fails to be caused, and instead, peeling from the interface is caused, while in the case where the ratio of the application area is no less than 94%, it becomes easy for the adhesive portions which are spaced via the gap portion to make contact with each other, and thus, sufficient glue cutting performance cannot be gained. In addition, taking the above described force for holding paper articles and the glue cutting performance into consideration, it is more desirable to set the ratio of the applied area to 53% to 75%.

In addition, in order to effectively avoid the formation of wrinkles or bubbles between a paper article and the adhesive layer when the adhesive product is utilized, it is desirable for the gap portion to be formed so as to open on the sides of the above described adhesive layer throughout the entirety of the adhesive layer. In addition, in order to appropriately hold paper articles or other members by making the thickness of the adhesive layer uniform so that stress can be concentrated when the adhesive layer is pressed against the paper articles or other members, it is desirable for the adhesive portions to be a number of adhesive blocks where the area occupied by each adhesive block to be 0.05 sq. mm to 75 sq. mm. Here, in the case where the area of the adhesive blocks is no greater than 0.05 sq. mm, it becomes difficult to provide them on a base, while in the case where the area is no less than 75 sq. mm, the glue cutting performance becomes significantly inferior when used, in such a manner that adhesive is applied continuously for 3 mm or more in the longitudinal direction for most adhesive products which have been adjusted for use so as to be in the form of a band of which the width is, for example, no greater than 25 mm. In addition, as concrete examples of adhesive blocks that have been provided in a desirable manner, a variety of forms such as grid forms of adhesive blocks and circular dot forms can be cited.

In particular, in the case where the base is provided so as to be removable from the above described adhesive layer, in a continuous movement for pasting a paper article to another member by using an intervening adhesive layer, a first pasting movement for pressing the adhesive against either the paper article or the other member in a state where the adhesive layer is supported by the base is carried out, and after that, a second pasting movement for pressing the adhesive layer against the other while peeling the base from this adhesive layer is carried out, and in this second pasting movement, the adhesive layer is again pressed against the side on which the adhesive layer has already been pasted through the first pasting movement. Therefore, the adhesive layer is strongly pasted on the side where the adhesive layer is usually pasted through the first pasting movement. Therefore, in the case where the adhesive portions are formed in such a manner that the area of the bottom, where these adhesive portions are supported by base, is greater than the area of the top surface, the same effects are gained as when the area of the bottom that is pasted through the second pasting movement is set wide, and thereby, adhesiveness can be increased, due to the wide setting of the area for pasting, which leads to an increase in the adhesiveness for the entirety of the adhesive layer. In addition, in order for the adhesive layer to be applied without failure with the area of the bottom of the adhesive portions wide, as has been set, it is desirable for the acrylic adhesive to easily melt when heated, so as to have high fluidity, and it is desirable for it to have the same properties as hot melt type adhesives, which have little shrinkage after application and allow for precise application.

In addition, it is desirable for the adhesive product according to the present invention to be utilized as a sticker, an adhesive tape or the like, by providing the adhesive layer to the above described base, which becomes the main body of the sticker or the main body of the adhesive tape, so as not to be removable.

In particular, the adhesive product according to the present invention can be made appropriate for use as a pressure sensitive transferring adhesive tape or the like, by providing the adhesive layer to the base so as to be removable. Here, in order to provide a removable adhesive layer, plastic films, such as polyethylene (PE), polyethylene terephthalate (PET), polypropylene (PP) and polyvinyl chloride (PVC), paper, such as glassine paper, and materials using a metal foil can be cited as the base. In addition, a base where a peeling layer made of a silicone resin or a fluorine resin is provided to the surface of a material which does not have a peeling effect in order to provide a peeling effect may be adopted.

Thus, when a pressure sensitive transferring adhesive tape as that described above is used for a transferring instrument, a user can comfortably use the adhesive product.

According to the present invention, an adhesive layer is intermittently placed on a base, and thereby, glue cutting performance when the adhesive layer is pasted only to a desired portion on a paper article or another member can be improved, and in addition, the adhesive layer is intermittently placed between a paper article and another member, and thereby, extra air can escape from portions where the adhesive does not exist when the paper article and the other member are pasted together, and thus, appropriate pasting can be carried out. In addition, a damaged paper phenomenon is caused when the adhesive is peeled from the paper article through a peeling movement, and thus, the paper article becomes of a state where it is ripped in the direction of the thickness, which cannot be reversed, and therefore, a mark where this adhesive product was pasted is inevitably left on the paper article. Accordingly, when such an adhesive product is used for sealing an envelope or the like, the envelope can be sealed with high precision and a good appearance, and at the same time, sealing having high security can be carried, such that a trace where the envelope has been opened can be left without failure. In addition, in the case where this adhesive product is utilized for the application of book binding, traces where pages have been separated after binding are inevitably left on the pages, that is to say, a type of paper article, and therefore, forgery or counterfeiting after binding can be effectively found and prevented.

In addition, a transferring instrument which is provided with such an adhesive product can be provided with an adhesive product having high reliability for a user, and such an adhesive product.

BRIEF DESCRIPTIONS OF THE DRAWINGS

FIGS. 5A to 5C are diagrams illustrating a movement according to the embodiment;

FIG. 6 is a plan diagram showing application patterns of an adhesive according to the embodiment;

FIG. 7 is a plan diagram showing application patterns of an adhesive according to the embodiment;

FIG. 8 is a plan diagram showing application patterns of an adhesive according to the embodiment;

FIG. 9 is a plan diagram showing application patterns of an adhesive according to the embodiment;

FIGS. 11A to 11C are diagrams showing appearances of adhesive products according to modifications of the embodiment; and FIGS. 12A to 12D are diagrams schematically showing evaluation standards of the peeling tests on paper articles according to one example of the present invention.

BEST MODE FOR CARRYING OUT THE INVENTION

In the following, a transferring instrument A that is provided with a pressure sensitive transferring tape 1, which is an adhesive product according to one embodiment of the present invention is described in reference to the drawings.

Figure 1:
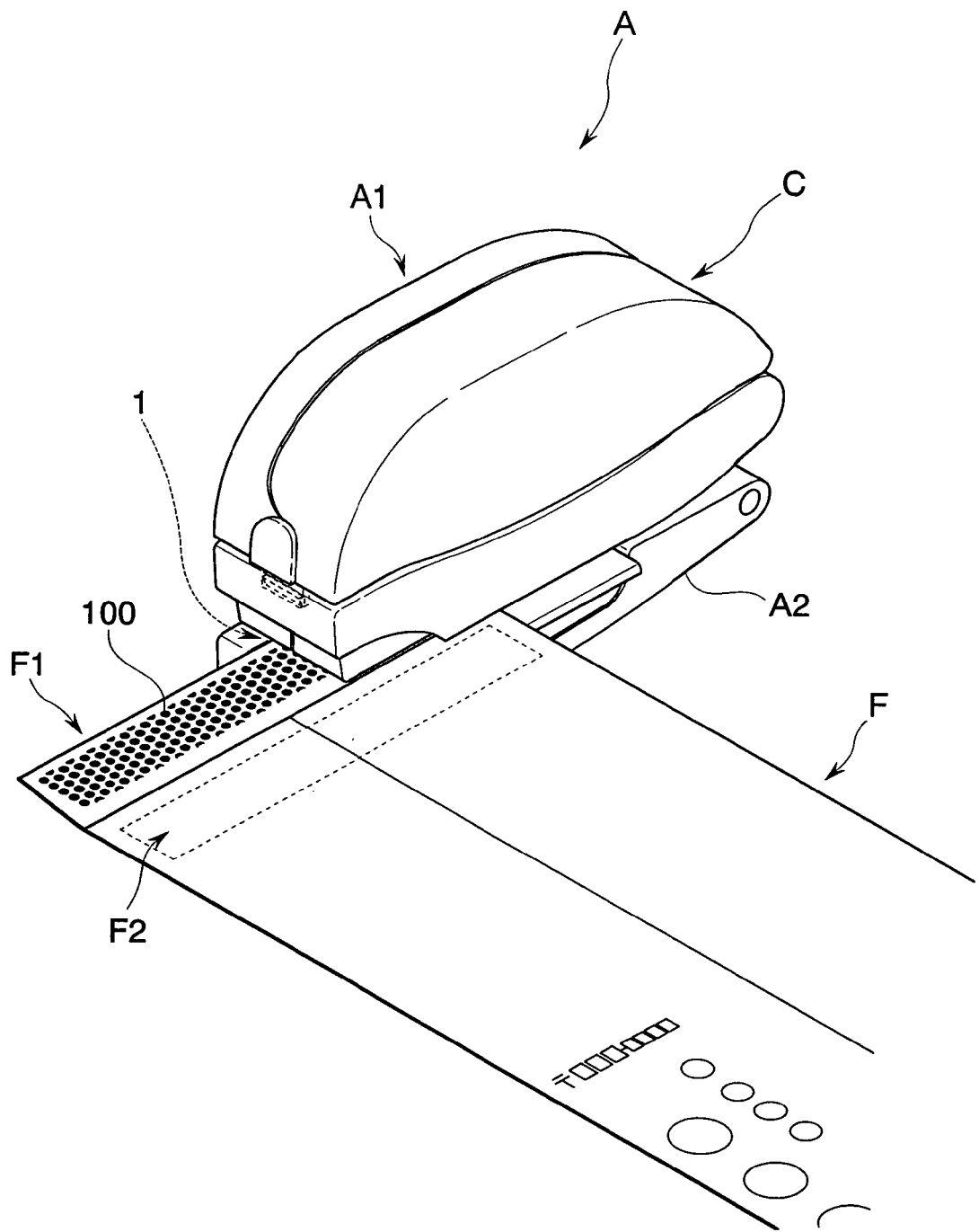
FIG. 1 is a diagram showing the appearance of a transferring instrument according to one embodiment of the present invention.
Figure 2:
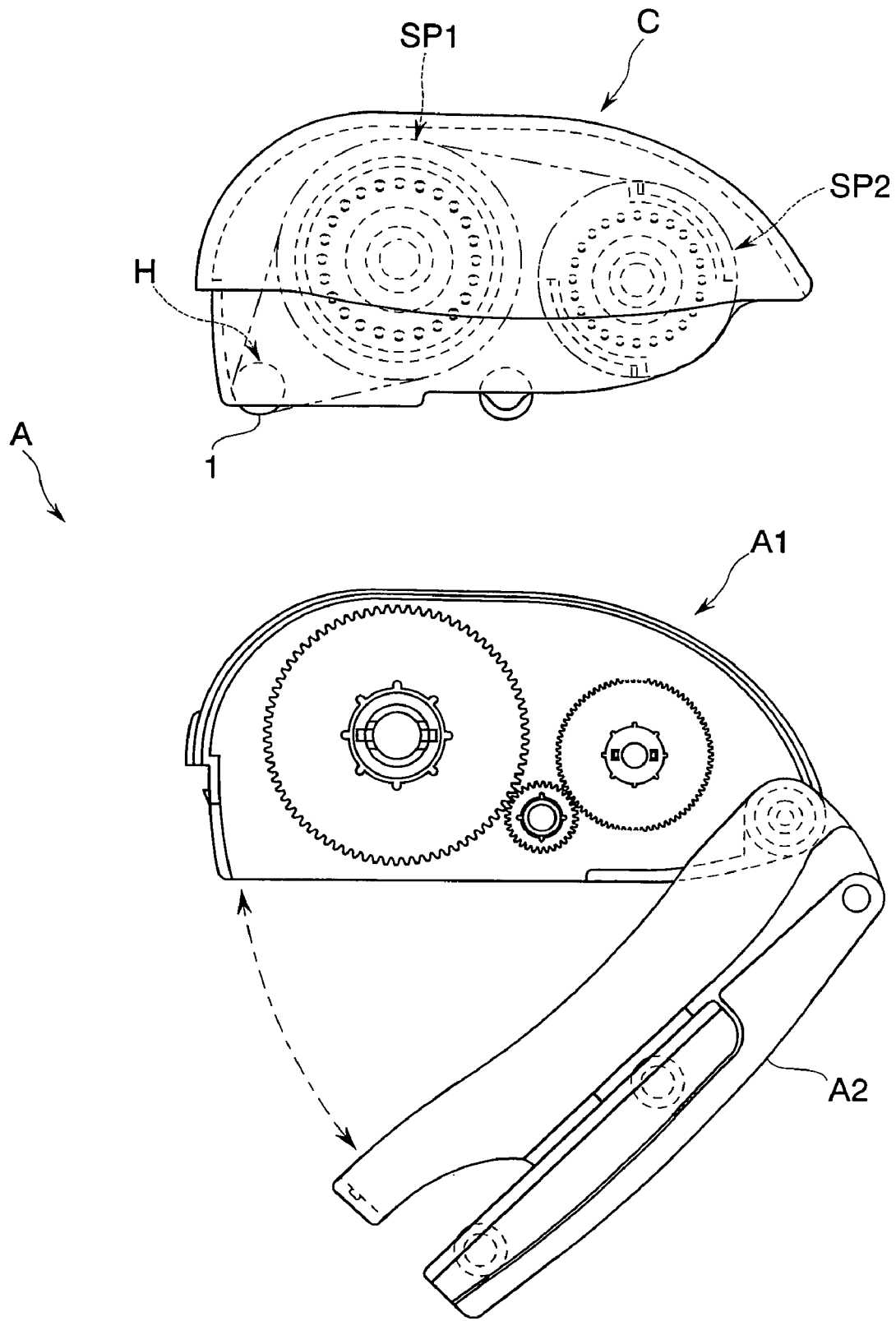
FIG. 2 is a plan diagram showing the configuration of the transferring instrument according to the embodiment.

As shown in FIGS. 1 and 2, this transferring instrument A is provided with a cartridge C for containing pressure sensitive transferring tape 1, a main body A1 of the transferring instrument, in which cartridge C is mounted and which can appropriately feed out pressure sensitive transferring tape 1, and an arm A2 for holding a white envelope F against main body A1 of the transferring instrument when the below described adhesive 100 is transferred to the white envelope. In addition, FIG. 1 shows a situation where white envelope F, for example, is slid and moved while holding the flap F1 of white envelope F between main body A1 of the transferring instrument and arm A2, and thereby, the below described adhesive 100 that has been applied in dot form on the surface of a film 12 which is the below described base is transferred along the end of flap F1. Here, after adhesive 100 has been transferred to flap F1 by applying pressure, flap F1 is folded along the end of the opening of white envelope F, and flap F1 and the vicinity of the opening end F2 are pasted together by being further pressed against each other in a state where adhesive 100 intervenes between flap F1 and the vicinity of the opening end F2, shown by a broken line, and thus, a state is gained, where white envelope F is sealed securely.

Here, pressure sensitive transferring tape 1 that is the adhesive product according to the present embodiment, which is mounted in transferring instrument A is characterized by being formed in such a manner that a damaged paper phenomenon where the surface layer portion of either flap F1, which is a paper article, or vicinity of the opening end F2 is stuck to the surface of the above described adhesive layer, and this is ripped in the direction of the thickness when a peeling movement such that flap F1 and vicinity of the opening end F2 are peeled from each other is carried out from a state where flap F1 and vicinity of the opening end F2, which are a paper article and another member, are pasted together via the below described adhesive layer 10 having adhesive 100. In addition, the strength of the surface of white envelope F is superior to that of high quality paper P (not shown) which is usually used for application in office work, and therefore, pressure sensitive transferring tape 1 can, naturally, cause a damaged paper phenomenon without failure to high quality paper P (not shown).

In the following, the concrete structure and configuration of pressure sensitive transferring tape 1 is described in detail on the basis of the structure of transferring instrument A.

As shown in FIG. 2, main body A1 of the transferring instrument and cartridge C have a structure which can be divided into near halves, and in this state, where cartridge C is partly exposed, cartridge C can be replaced. That is to say, cartridge C has pressure sensitive transferring tape 1, which is a consumable part, and winding spools SP1 and SP2, which are parts of a feed out mechanism, and a transferring head H, which is a replaceable part, and these can be replaced with new goods in a state where they are attached to this replaceable cartridge C. Here, body A1 of the transferring instrument holds permanent parts of the feed out mechanism.

Figure 3:
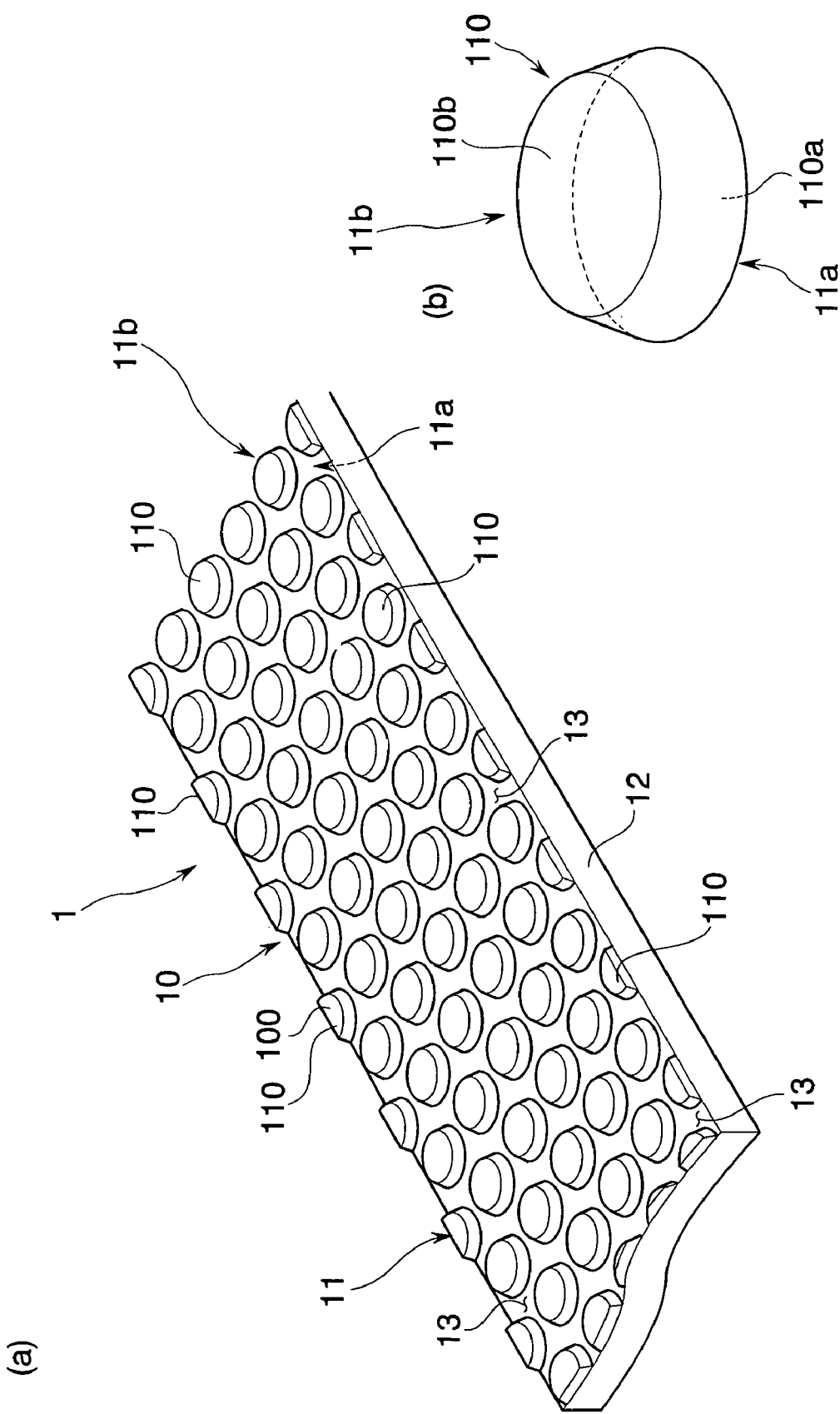
FIGS. 3A and 3B are diagrams schematically showing the configuration of a pressure sensitive transferring tape according to the embodiment.
Figure 4:
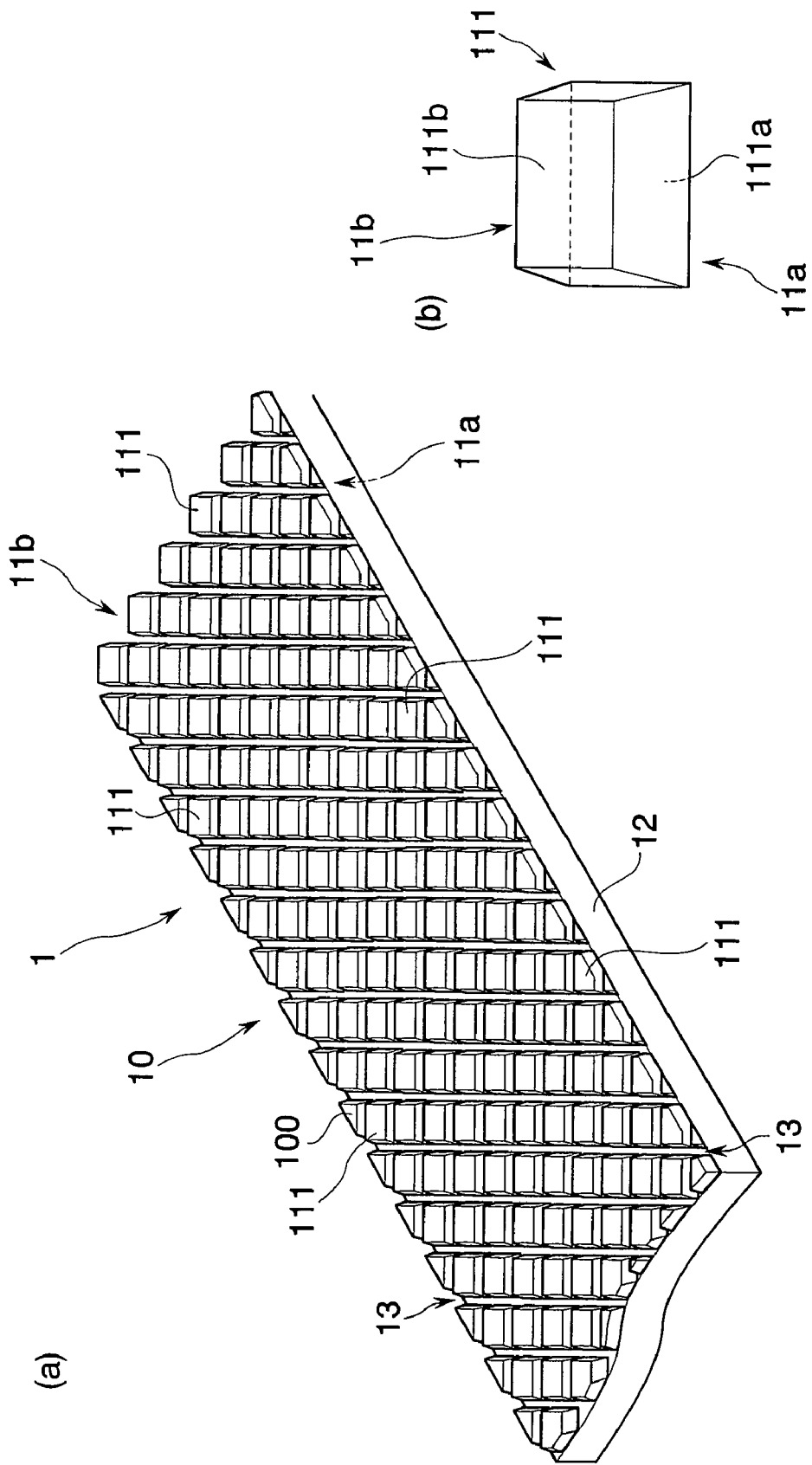
FIGS. 4A and 4B are diagrams schematically showing the configuration of a pressure sensitive transferring tape according to the embodiment.

As shown in FIGS. 3 and 4, pressure sensitive transfer tape 1 has an adhesive layer 10 having adhesive 100, which is the below described acrylic adhesive, and a film 12 which is a base for supporting adhesive 10, and the above described adhesive layer 10 is formed in such a manner that adhesive 100 is intermittently placed on the surface of film 12. In addition, FIG. 3 schematically shows a state where a pattern of "dots" which are formed of the below described dot blocks 110 and which are dots in circular form in a plan view having a diameter of, for example, 1.5 mm, is applied to the surface of film 12, in the same manner as shown in FIGS. 1 and 6, and FIG. 4 schematically shows a state where a pattern "grid" that is formed of the below described grid having squares in a plan view of which the side is, for example, 1.3 mm, is applied to the surface, in the same manner as shown in FIG. 7. Here, other patterns that can be applied to film 12 are described in detail below (FIGS. 6, 7, 8 and 9).

Film 12 is made of a polyethylene terephthalate (PET) film that is removable from, for example, adhesive 100 in the present embodiment, but is not limited to this polyethylene terephthalate, and may be a material which is removable from adhesive 100 that is an acrylic adhesive. Here, plastic films, such as polyethylene (PE), polypropylene (PP) and polyvinyl chloride (PVC), sheets of paper, such as glassine paper, and metal foils can be cited as films which are removable from an acrylic adhesive. In addition, films where a removable layer made of a silicon resin or a fluorine resin is provided to the surface of a material which does not have a peeling effect in order to gain a peeling effect can also be cited.

Adhesive layer 10 is formed of adhesive 100 which has been intermittently placed on the surface of film 12 in order to effectively avoid the formation of wrinkles or bubbles between a paper article and another member according to the present invention, that is to say, flap F1 and vicinity of the opening F2 according to the present embodiment, while providing adhesiveness that is sufficient to cause a damaged paper phenomenon. In particular, a pattern of adhesive 100 is applied to the surface of film 12 so as to form adhesive portions 11 made of adhesive 100 and a gap portion 13 which intervenes between these adhesive portions 11. According to the present embodiment, the thickness of adhesive layer 10 that is applied to the surface of film 12 is set to 30 µm. In addition, the ratio of the application area occupied by adhesive portions 11 having this thickness is set to 53% to 75%. Furthermore, the same properties are exhibited when the thickness of the adhesive layer is set to, for example, 60 µm. Here, as methods for applying a pattern to the surface of film 12, as shown in FIGS. 3 and 4, existing printing methods, such as screen and gravure printing, offset printing, and flexographic and gravure printing can be used.

Adhesive portions 11 are formed of dot blocks 110, which are adhesive blocks in circular form in FIG. 3, and are formed of grate blocks 111, which are adhesive blocks in grate form. In addition, in an adhesive portion 11, the side that makes contact with film 12 has a bottom surface 11a, and the side that makes contact with flap F1 of white envelope F has a top surface 11b. In addition, the area of bottoms 110a and 111a of the individual dot blocks 110 and grate blocks 111 are set to be greater than the area of top surfaces 110b and 111b, and thereby, the area of bottom surface 11a of an adhesive portion 11 is set to be greater than the area of top surface 11b.

Dot blocks 110 and grate blocks 111 are respectively described in detail in the following. The area of bottom surface 110a of dot blocks 110 shown in FIG. 3 is set to be a form having 0.05 sq. mm to 9 sq. mm in a plan view, and thereby, adhesive layer 10 can be uniformly pressed, so that pressure is appropriately concentrated at the time of pressing while effectively avoiding the formation of unevenness at a point where the dot blocks are pasted. In addition, grate blocks 111 shown in FIG. 4 are formed in such a manner that the sides which form bottoms 111a and top surfaces 111b extend in the direction that inclines toward the direction where pressure sensitive transferring tape 1 is actually transferred, that is to say, the longitudinal direction of film 12, and thereby, the individual grate blocks 111 are formed so as to peel in a diagonal direction, and thus, can be transferred appropriately.

Gap portion 13 is a space intervening between dot blocks 110 or grate blocks 111, which are respectively adhesive blocks, as shown in FIGS. 3 and 4, and gap portion 13 is formed in such a manner that the sides of adhesive layer 10 have openings along approximately the entirety of this adhesive layer 10, as shown in these figures. In other words, adhesive layer 10 is formed in such a manner that any part of the gap portion on approximately the entirety of the surface of adhesive layer 10 is connected to a side.

Here, in pressure sensitive transferring tape 1 according to the present embodiment, the area of bottom surface 11a of adhesive portions 11 is set to be greater than the area of top surface 11b, as described above, and thereby, the adhesiveness of adhesive layer 10 is increased. In the following, the process for transferring pressure sensitive transferring tape 1 is concretely described in reference to FIGS. 5A to 5C, which schematically illustrate the process. FIGS. 5A, 5B and 5C show the sequential process for transferring adhesive 100 along the end of flap F1 of white envelope F using transferring instrument A in order to seal white envelope F. The details are described in the following. When adhesive 100 is transferred by means of transferring instrument A, adhesive 100 is transferred to flap F1, and at the same time, the first pressing movement is carried out, where dot blocks 110 are pressed by transferring head H in a state where top surfaces 110b of dot blocks 110 are attached to flap F1 (FIG. 5A). Then, flap F1 is folded in a state where top surfaces 100b are attached to flap F1 (FIG. 5B), and bottom surfaces 110a make contact with the vicinity of opening F2, which is located on the lower side in the figure, and the second pressing movement is carried out from, for example, the upper side in the figure (FIG. 5C). At this time, top surfaces 110b, which have already been attached to flap F1, are pressed again, and thereby, are further attached to flap F1 without failure, and at the same time, the respective dot blocks 110 are compressed, and thereby, the volume of gap portion 13 is reduced, in such a manner that the air that existed in the compressed gap portion 13 flows out from the sides of adhesive layer 10, since gap portion 13 is formed so as to have openings on the sides of adhesive layer 10, and thus, the formation of bubbles and wrinkles caused by air that has remained between adhesive layer 10 and flap F1 or the vicinity of opening F2 can be effectively avoided. In addition, though bottom surfaces 110a of dot blocks 110 are pressed only once throughout this continuous movement, the area of bottom surfaces 110a is set to be greater than the area of top surfaces 110b, as described above, and the adhesiveness of bottom surfaces 110a, that is to say, on the bottom surface 11a side of adhesive portions 11, is set to be greater, and therefore, the bottom surface 11a side and the top surface 11b side of adhesive portions 11 are pasted to flap F1 and the vicinity of opening F2 in a well balanced manner, and thus, flap F1 and the vicinity of opening F2 can be pasted together without failure. Here, though dot blocks 110 are described in reference to FIG. 5, which illustrates dot blocks 110, the same effects can be gained with grate blocks 111.

In addition, FIGS. 6, 7, 8 and 9 show application patterns where adhesive 100, which is an acrylic adhesive, for pasting flap F1 and the vicinity of opening F2 together without failure, as described above, is applied to the surface of film 12. Here, in each of the patterns shown in these figures, black portions without frame lines are adhesive portions 11, and white portions are gap portion 13. In addition, the upward and downward directions are the longitudinal direction of pressure sensitive transferring tape 1, that is to say, the direction in which the tape is transferred by means of transferring instrument A. Here, the ratio of the application area in the application patterns shown in the below is 18% to 94%.

FIG. 6 shows a "dot" pattern made of dots in circular form having a diameter of 1.5 mm, as shown in FIGS. 1 and 3, in addition to a "fine dot" pattern made of dots in circular form having a diameter of 1 mm, which has the same effects as the above described "dot" pattern, a "dot φ2" pattern made of dots in circular form having a diameter of 2 mm, and a "dot φ2+mesh" pattern, where fine dots having an area of 0.017 sq. mm, for example, surround, dots in circular form having a diameter of 2 mm. These patterns can provide high glue cutting properties, irrespectively of the setting of a high ratio of the application area.

FIG. 7 shows a "flat grate" pattern, where dots in diamond form having sides of 1.3 mm and different angles formed in each adhesive block are aligned at intervals of 0.3 mm, in addition to a "grate" pattern as that shown in FIG. 4. These patterns have properties such that each adhesive portion 11 can be peeled from film 12 in an excellent manner.

FIG. 8 shows a "gingko" pattern made of dots in gingko leaf shape having a width of 2 mm, a "brick" pattern, where rectangles having dimensions of 1 mm×1.7 mm are aligned at intervals of 0.3 mm, and a "fine hexagonal" pattern made of regular hexagons having sides of 1 mm as modified patterns of the grate pattern. In this manner, it is possible to form patterns having excellent designs, by modifying the grate pattern. Here, glue cutting performance as high as that of the above described "dot" pattern can be provided to "brick" and "fine hexagonal" patterns, by setting grate blocks 111 to a small size.

FIG. 9 shows a "tire" pattern, where the area of one main adhesive block that forms an adhesive portion 11 is set to 0.05 sq. mm, which is the minimum in the present embodiments, so that the properties of the "dot" and "grate" patterns can be provided, and the respective adhesive blocks are aligned in a shape which is close to the grate form, as well as "big wave" and "lateral stripe" patterns, where the area per adhesive block that forms an adhesive portion 11 is set to the maximum. Here, the width of the adhesive blocks in the direction in which the adhesive is transferred by means of transferring instrument A, that is to say, in the longitudinal direction in the figures, the width of the adhesive blocks in "big wave" pattern is set to 2 mm, and respective blocks are provided at intervals of 1 mm, and the width of the adhesive blocks in "lateral stripe" pattern is set to 3 mm, and respective blocks are provided at intervals of 0.2 mm. Therefore, in the case where the width of pressure sensitive transferring tape 1 is set to, for example, 25 mm, the area of the bottom surface of each adhesive block becomes 75 sq. mm (Table 4 (shown below)), and the present embodiment does not, of course, limit the width of pressure sensitive transferring tape 1.

Figure 10:
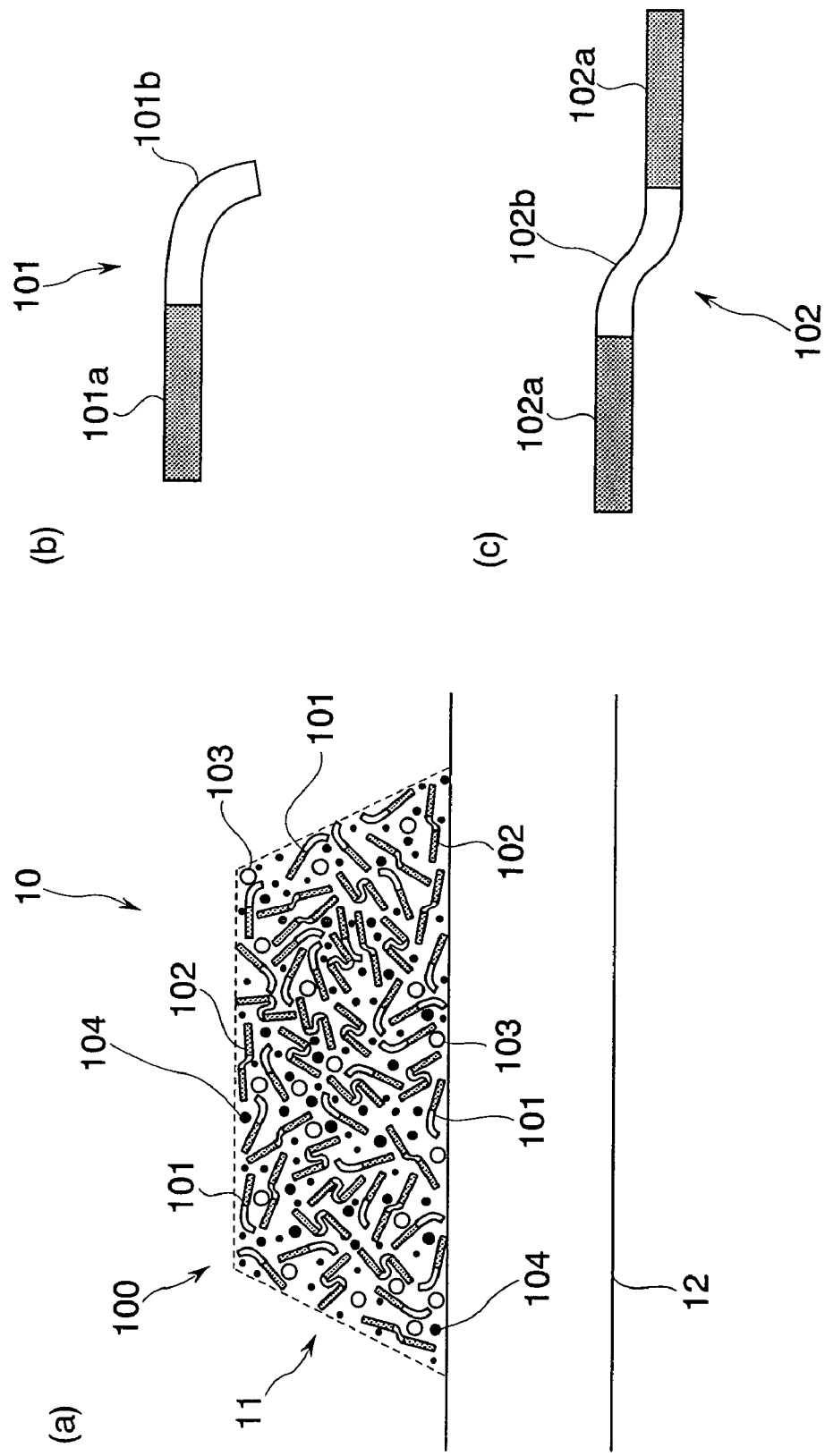
FIGS. 10A to 10C are diagrams schematically showing the configuration of an adhesive according to the embodiment.

Next, the composition of the acrylic adhesive that is adopted as adhesive 100 according to the present embodiment is described in reference to the schematic diagram shown in FIGS. 10A, 10B and 10C.

As schematically shown in FIG. 10A, adhesive 100 is a hot melt type adhesive where 100 pts. wt. of a diblock copolymer 101, 100 pts. wt. of a triblock copolymer 102, 40-60 pts. wt. of a first tackifier 103, and 200 pts. wt. of a second tackifier 104 are mixed.

As shown in FIG. 10B, diblock copolymer 101 is an acrylic diblock copolymer where a hard block 101a that has been made by polymerizing methacrylate having an alkyl group with 1 to 5 carbon atoms or an alkyl group having a ring structure, and a soft block 101b that has been made by polymerizing alkylacrylate having an alkyl group with 1 to 20 carbon atoms or alkyl methacrylate having an alkyl group with 5 to 20 carbon atoms are polymerized, and in the present embodiment, LA Polymer #1114, made by Kuraray Co., Ltd., is adopted.

As shown in FIG. 10C, triblock copolymer 102 is a polymer where hard blocks 102a are connected to both ends of soft block 102b. Hard block 102a is made by polymerizing alkyl methacrylate and soft block 102b is made by polymerizing alkylacrylate. Thus, in the present embodiment, LA Polymer #2140, made by Kuraray Co., Ltd., is adopted.

Rosin derivatives, such as rosin ester, rubber rosin, tall oil rosin, hydrogenated rosin ester, maleic modified rosin and disproportionate rosin ester; terpene based resins such as terpene phenol resins, resins of which the main component is α-pinene, β-pinene, limonene or the like; (hydrogenated) petroleum resins, coumarone-indene resins, hydrogenated aromatic copolymers, styrene based resins, phenol based resins and xylene based resins, can be cited as examples of first tackifier 103 and second tackifier 104, and one or more types of these can be utilized. In the present embodiment, Arufon UP-100, made by Toagosei Co., Ltd., which is an acrylic tackifier, is adopted as first tackifier 103. In addition, Super Ester A115, made by Arakawa Chemical Industries, Ltd., which is a rosin ester based tackifier, is adopted as the second tackifier.

As described above, in pressure sensitive transferring tape 1, which is the adhesive product according to the present embodiment, adhesive layer 10 is formed through so-called pattern application, where adhesive 100 is intermittently placed on the surface of film 12, which is the base, and thereby, glue cutting performance at the time when adhesive layer 10 is transferred to flap F1 is improved, and in addition, appropriate pasting and sealing can be carried out on white envelope F without forming wrinkles or bubbles. In addition, the surface layer portion of white envelope F is attached to the surface of adhesive layer 10, and a damaged paper phenomenon, such that white envelope F is ripped in the direction of the thickness, is caused when a peeling movement is carried out, and therefore, a damaged paper phenomenon is caused when adhesive 100 is removed from a paper article through a peeling movement, and thereby, white envelope F is converted to a state where it is ripped in the direction of the thickness, which cannot be reversed, so that a trace can be inevitably left on white envelope F where white envelope F was once pasted by means of pressure transferring tape 1. That is to say, white envelope F is sealed with high precision and a good appearance, and sealing with high security can be gained. White envelope F that is used in the present embodiment has a surface strength that is higher than that of the high quality paper that is widely used in office work, and therefore, an appropriate damaged paper phenomenon is, of course, caused to high quality paper P (not shown).

Though a variety of types of adhesive can, of course, be used as adhesive 100, an acrylic adhesive is adopted as adhesive 100, in order to cause a damaged paper phenomenon without failure and make precise and efficient application possible, assuming that a general printing method, such as screen printing or gravure printing, is adopted as a method for applying adhesive layer 10 to film 12 in the process for manufacturing pressure sensitive transferring tape 1, which is the adhesive product.

An acrylic adhesive having a concrete configuration where 100 pts. wt. of LA Polymer #1114, made by Kuraray Co., Ltd., 100 pts. wt. of LA Polymer #2140, made by Kuraray Co., Ltd., 40-60 pts. wt. of Arufon UP-1000, made by Toagosei Co., Ltd., and 200 pts. wt. of Super Ester A115, made by Arakawa Chemical Industries, Ltd., are mixed is adopted, and also has the same properties as a hot melt type adhesive, and thereby, adhesive 100 can be applied to film 12 in accordance with the above described general printing method, in the manufacturing process.

In addition, though the thickness of adhesive layer 10 is made to be 30 μm to 60 μm as a result of application of adhesive 100, for which an acrylic adhesive as that described above is adopted, appropriate application is possible if the thickness is 15 μm to 80 μm, and the thickness may be 10 μm to 100 μm, in order to cause damage to white envelope F.

Thus, adhesive portions 11 and gap portion 13 are formed through intermittent application of adhesive 100, and when the ratio of the application area occupied by adhesive portions 11 to the surface area of film 12 is set to 53% to 75%, pressure sensitive transferring tape 1 has high glue cutting performance and causes a damaged paper phenomenon, and the ratio of the application area for providing adhesiveness for damaging paper and glue cutting performance can be set to 18% to 94%.

In addition, gap portion 13 is formed in such a manner that openings are provided on the sides of adhesive layer 10 throughout approximately the entirety of this adhesive layer 10, in other words, gap portion 13 is connected to the sides of adhesive layer 10, and therefore, the formation of bubbles and wrinkles between adhesive layer 10 and white envelope F can be effectively prevented.

In the case where the concrete configuration of adhesive portions 11 has dot blocks 110 and grate blocks 111, which are a number of adhesive blocks, and the width of pressure sensitive transferring tape 1 is 25 mm, an application pattern is adopted such that the dimension of each of the adhesive blocks is set to 0.05 sq. mm to 75 sq. mm, and thereby, the formation of unevenness in adhesive layer 10 can be effectively prevented, so that pressure can be appropriately applied throughout the pasting portion, and thus, white envelope F can be pasted without failure.

In addition, in pressure sensitive transferring tape 1 according to the present embodiment, the area of bottoms 110a and 111a has been set so as to be greater than the area of top surfaces 110b and 111b in the form of dot blocks 110 and grate blocks 111, which are adhesive blocks that form adhesive portions 11, and therefore, the area of bottoms 110a and 111a, which are pasted through the second pasting movement, is set so as to be greater than the top area, unlike in conventional adhesive portions, where the side that is pasted through the first pasting movement, that is to say, pasting between flap F1 and adhesive layer 10, is stronger, and thereby, adhesiveness between bottoms 110a and 111a and the vicinity of opening F2 can be increased, and the adhesiveness of pressure sensitive transferring tape 1, which is an adhesive product, can be increased.

Though the embodiments of the present invention are described in the above, the concrete configuration of each portion is not limited to the above described embodiments.

For example, though in the above described embodiments, film 12, which is the base, is formed so as to be removable from adhesive layer 10, and thereby, the adhesive product according to the present invention can be used in transferring instrument A, which is pressure sensitive transferring tape 1, the base may be provided so as not to be removable from the adhesive layer.

That is to say, the base may serve as another member in the present invention, and thereby, it is also possible to use the adhesive product of the present invention as, for example, a sticker 2, as shown in FIG. 11A, or an adhesive tape 3, as shown in FIG. 11C.

The details are described in the following. FIG. 11A shows sticker 2, where adhesive layer 20 is provided so as not to be removable on the rear surface of the main body of sticker 22, which is the base. In addition, sticker 2 is usually supported by a sticker support D that is formed so as to be removable from adhesive layer 20, and sticker 2 is peeled from sticker support D when used. In addition, adhesive layer 20 is formed of adhesive portions 21 made of a number of dot blocks 210 and gap portion 23, and therefore, it is difficult for bubbles and wrinkles to form in the pasting portion, in the same manner as in the above described embodiments. Thus, Adhesive layer 21 that has been placed on the rear surface of a peripheral portion 22a is appropriately separated from the adhesive layer that is placed on the rear surface of the main body of sticker 22 when sticker 2 is peeled from support D, and thereby, sticker 2 having high glue cutting performance can be gained.

In addition, adhesive tape 3 is appropriate for use for, for example, application to office work or book binding. In this adhesive tape 3, adhesive layer 30 makes it difficult for wrinkles and bubbles to be formed in the pasting portion, as described above, and high glue cutting performance is gained when a desired length of the main body of adhesive tape 32 is cut. In the case where this adhesive tape 3 is adopted for the application of book binding, when forgery or counterfeiting, such as switching of pages, is carried out after binding, traces can be left without failure through the damage of pages, and therefore, such forgery or counterfeiting can be effectively found and prevented.

A variety of modifications are possible for the concrete configurations of other parts, as long as the gist of the present invention is not deviated from.

EXAMPLES

Next, examples are cited for further description, and the present invention is not limited to these examples.

1: Qualifying Test for Pattern Application

First, the quality of pattern application by means of gravure printing or screen printing using adhesives in accordance with the examples and the comparative examples of the present invention are examined. In the following, the examples and the comparative examples are described.

Examples 1 and 2

From among acrylic adhesives shown in the above described embodiment, an acrylic adhesive containing a mixture of 100 pts. wt. of LA Polymer #2140 made by Kuraray Co., Ltd., 50 pt. wt. of Arufon UP-1000, made by Toagosei Co., Ltd., 100 pts. wt. of LA Polymer #1114, made by Kuraray Co., Ltd., and 200 pts. wt. of Super Ester A115, made by Arakawa Chemical Industries, Ltd., was adopted. Then, pressure sensitive transferring tapes were manufactured through pattern application by means of screen printing and gravure printing, where were Examples 1 and 2, respectively.

Comparative Example 1

SIS (H2155-01 made by Nitta Gelatin Inc.) was used as the adhesive, and a pressure sensitive transferring tape was manufactured through pattern application by means of gravure printing, which was Comparative Example 1.

Comparative Examples 2 to 5

An acrylic emulsion adhesive (Saibinol AT-21 made by Saiden Chemical Industry Co., Ltd.), an acryl solvent based adhesive (SK Dyne 701 made by Soken Chemical & Engineering Co., Ltd.), an SIS adhesive (35 pts. wt. of an SIS based adhesive that is the same as that used in Comparative Example 1 is dissolved in 65 pts. wt. of toluene and the resulting adhesive is applied and then dried, and thus, a film is formed) and UV Syrup (UV TAC-00326 made by Teikoku Printing Inks Mfg. Co., Ltd.) was used as an adhesive, and pressure sensitive transferring tapes were manufactured through pattern application by means of screen printing, which were Comparative Examples 2, 3, 4 and 5, respectively.

<Test Method>

The adhesives shown in the above were applied to a "dot" pattern (FIG. 6) by means of the above described printing method so as to have an application thickness of 30 μm and 60 μm and a ratio of application area of approximately 63%, and the finish after the application was observed with the eye. Here, existing methods were adopted for the gravure printing and the screen printing, and therefore, detailed descriptions thereof are herein omitted.

<Test Results>

Table 1 shows the results of the qualifying test for pattern application. As shown in this table, the appropriate quality for pattern application was perceived for Examples 1 and 2 which were examples using an acrylic adhesive irrelevant of the type of printing whether it was screen printing or gravure printing. In addition, the appropriate quality for pattern application was also permitted for Comparative Examples 1, 2 and 5. In addition, no difference was noted in the results of the above described test which was carried out on the above described examples and comparative examples, and which exhibited the same results as those in Table 1, between adhesives having an application thickness of 30 μm and adhesives having an application thickness of 60 μm.

TABLE 1

| Test category | Adhesive | Printing Method | Quality of pattern application |
|---|---|---|---|
| Example 1 | Acrylic | Screen | ○ |
| Example 2 | Acrylic | Gravure | ○ |
| Comparative Example 1 | SIS | Gravure | ○ |
| Comparative Example 2 | Aqueous acrylic emulsion | Screen | ○ |
| Comparative Example 3 | Solvent based | Screen | X |
| Comparative Example 4 | Solvent based SIS | Screen | X |
| Comparative Example 5 | UV Syrup | Screen | ○ |

2: Peeling Test on Paper Article

Next, a peeling test on paper articles was carried out, that is to say, the existence of a broken paper phenomenon on paper articles was examined for the pressure sensitive transferring tapes in accordance with the examples and the comparative examples where an appropriate quality of pattern application was perceived in the above described qualifying test of pattern application, and the same test was carried out on Comparative Examples 6 to 12 where pressure sensitive transferring tapes, which are currently adopted for commercially available transferring instruments, were used. In the following, Comparative Examples 6 to 12 are described.

Comparative Example 6

A pressure sensitive transferring tape, which is mounted in a transferring instrument made by Herma GmbH (Trade Name: HERMA Transfer Permanent Glue Dispenser), was used. Here, a pattern is applied on a base of this pressure sensitive transferring tape.

Comparative Examples 7 and 8

A pressure sensitive transferring tape, which is mounted in a transferring instrument made by Tombow (Trade Name: Tape Glue Pit Tape MS12), was used. Here, an adhesive is applied to a base of this pressure sensitive transferring tape, and a tape where the adhesive is applied to the entire surface was used as Comparative Example 7. In addition, a tape, where the adhesive layer is partially inactivated (hereinafter referred to as partial inactivation) so that only the adhesive, which is located in the portions that have approximately the same arrangement of the adhesive in the application pattern that was adopted in the above described qualifying test for pattern application, has adhesiveness, was used as Comparative Example 8.

Comparative Examples 9 and 10

A pressure sensitive transferring tape that is mounted in a transferring instrument made by Plus Corporation (Trade Name: Tape Glue Tape Glue R Strong Adhesive Type TG-210) was used. Here, an adhesive is applied to a base of this pressure sensitive transferring tape, and a tape where the adhesive is applied to the entire surface was used as Comparative Example 9. In addition, a tape where a partial inactivation process has been carried out on Comparative Example 9 was used as Comparative Example 10.

Comparative Examples 11 and 12

A pressure sensitive transferring tape that is mounted in a transferring instrument made by Kokuyo Co., Ltd., (Trade Name: Prit Roller Ta-M460) was used. Here, an adhesive is applied to a base of this pressure sensitive transferring tape, and a tape where the adhesive is applied to the entire surface was used as Comparative Example 11. In addition, a tape where a partial inactivation process has been carried out on Comparative Example 11 was used as Comparative Example 12.

<Test Method>

First, the above described examples and comparative examples were transferred to a stainless plate, and after that, the bases were peeled and a partial inactivation process was carried out on Comparative Examples 8, 10 and 12 in this state. After the partial inactivation process, pieces of paper, gained by cutting a commercially available white envelope (Trade Name: White Envelope WP2270 (Square Type No 2, A4 Size) made by Okina Co., Ltd.) out into stripe form, were pasted to the respective examples and comparative examples, and furthermore, they were pressed by a 1 kg roll which was rolled back and forth at a speed of 10 mm/s, and 40 minutes later, a peeling movement was carried out by pulling the pieces of paper in the direction of 180 degrees at a speed of 0.8 mm/s. Then, the results were evaluated and categorized into any of the following: "damaged paper": the piece of paper is peeled with the surface layer portion of the piece of paper attached to the surface of the adhesive layer (FIG. 12A), "peeling from the interface": the piece of paper is peeled from the interface between the adhesive layer and the piece of paper (FIG. 12B), "peeling with aggregation": the piece of paper is peeled in a state where the adhesive is attached to both the paper article and the stainless plate (FIG. 12C) and "separation": the piece of paper is peeled in a state where the adhesive layer is separated and attached to both the paper article and the stainless plate (FIG. 12D).

<Test Results>

TABLE 2

| Test category | Adhesive/ Product maker | Printing method/ Application pattern | Evaluation | |
|---|---|---|---|---|
| Example 1 | Acrylic | Screen | Damaged paper | |
| Example 2 | Acrylic | Gravure | Damaged paper | |
| Comparative Example 1 | SIS | Gravure | Peeling from interface | |
| Comparative Example 2 | Aqueous acrylic emulsion | Screen | Peeling from interface | |
| Comparative Example 5 | UV Syrup | Screen | Peeling from interface | |
| Comparative Example 6 | Herma | Pattern | Peeling from interface | |
| Comparative Example 7 | Tombow | *Pattern | Peeling from interface | *Partial inactivation process |
| Comparative Example 8 | Tombow | Solid printing | Damaged paper | |

TABLE 2-continued

| Test category | Adhesive/ Product maker | Printing method/ Application pattern | Evaluation | |
|---|---|---|---|---|
| Comparative Example 9 | Plus | *Pattern | Peeling from interface | *Partial inactivation process |
| Comparison Example 10 | Plus | Solid printing | Peeling from interface | |
| Comparative Example 11 | Kokuyo Prit Roller | *Pattern | Peeling from interface | *Partial inactivation process |
| Comparative Example 12 | Kokuyo Prit Roller | Solid printing | Peeling from interface | |

Table 2 shows the results of peeling test on paper article. As shown in this table, only Examples 1 and 2 as well as Comparative Example 8 can damage pieces of paper made of a white envelope. However, Comparative Example 9, where a partial inactivation process had been carried out on comparative example 8, did not damage the paper, and therefore, only Examples 1 and 2 exhibited the properties which caused damage to the paper from among adhesive tapes on which pattern application had been carried out. Here, all of the adhesive tapes which did not cause damage to the paper exhibited peeling from the interface. In addition, Examples 1 and 2 as well as Comparative Examples 1, 2 and 5 did not exhibit any difference in the results between the adhesive tapes having a thickness of applied adhesive of 30 μm in which the above described tests were carried out and the adhesive tapes having a thickness of applied adhesive of 60 μm in which the above described tests were carried out and exhibited the same results as in Table 2.

3: Test for Measuring Application Thickness that can Damage Paper

The range of the application thickness that could cause a damaged paper phenomenon for each application pattern shown in the above described embodiments of the adhesives according to the above described Examples 1 and 2 was examined.

<Test Method>

A peeling test was carried out on the adhesives according to the above described Examples 1 and 2 which had been applied to the application patterns shown in FIGS. 6, 7, 8 and 9, "dots," "dots φ2," "dots φ2+mesh," "grate," "flat grate," "ginkgo leaves," "bricks," "fine hexagons," "tire" and "big waves" so as to have a variety of thicknesses in accordance with a test method that is the same as the above described peeling test on paper articles, and FIG. 3 shows the upper limit and the lower limit of the thicknesses that have caused damage to the paper (FIG. 12A) for the respective application patterns.

<Test Results>

TABLE 3

| Application pattern | Lower limit of thickness of adhesive layer (μm) | Upper limit of thickness of adhesive layer (μm) |
|---|---|---|
| Dots | 27.3 | 71.4 |
| Dots φ2 | 16.1 | 70.4 |
| Dots φ2 + mesh | 19.1 | 70.9 |
| Grate | 20.5 | 66.2 |
| Flat grate | 21.7 | 37.2 |
| Gingko leaves | 18.3 | 37.8 |
| Bricks | 37.7 | 79.9 |
| Fine hexagons | 28.9 | 71.7 |
| Tire | 14.8 | 32.2 |
| Big waves | 17.5 | 74.6 |

As shown in Table 3, a damaged paper phenomenon was caused in the adhesive that had been applied in the "tire" pattern so as to have a thickness of 14.8 μm and the paper was also damaged by the adhesive that had been applied in the "bricks" pattern so as to have a thickness of 79.9 μm. Accordingly, Table 3 shows that the adhesive layers of the present examples that had been applied so as to have a thickness in a range from 15 μm to 80 μm cause damage to the paper of a white envelope. In addition, it is assumed that the application patterns other than those shown in Table 3 allow the formation of an adhesive product which has a thickness of the adhesive in a range from 10 μm to 100 μm and can cause damage to the paper of a white envelope in the case where the adhesives according to Examples 1 and 2 are used. Thus, it is assumed that the optimal thickness for causing damage to the paper of a white envelope ranges from 30 μm to 60 μm where damaged paper is exhibited for the majority of application patterns, for example, in Table 3.

4: Measurement of Ratio of Area and Occupied Area in Respective Application Patterns Next, the ratio (%) of the area occupied by the adhesive portions per unit area, and the area occupied by the main adhesive blocks that form the adhesive portions on a base, that is to say, the occupied area, in the case where the width of the pressure sensitive adhesive tape is 25 mm, were examined for "dots," "fine dots," "dots φ2," "dots φ2+mesh," "grate," "flat grate," "gingko leaves," "bricks," "fine hexagons," "tire," "big waves" and "lateral stripes" patterns which are application patterns shown in FIGS. 6, 7, 8 and 9 as well as a "large grate" pattern (not shown), which is a modification of the "grate" pattern and where squares having sides of 3 mm, are arranged at intervals of 0.1 mm, of which the results are shown in Table 4.

TABLE 4

| Application pattern | Ratio (%) of area per unit area | Occupied area (mm²) |
|---|---|---|
| Dots | 63.0 | 1.77 |
| Fine dots | 53.7 | 0.79 |
| Dots φ2 | 68.7 | 3.15 |
| Dots φ2 + mesh | 75.2 | 3.15 |
| Grate | 66.0 | 1.69 |
| Large grate | 93.7 | 9.00 |
| Flat grate | 28.4 | 1.36 |
| Gingko leaves | 35.6 | 1.46 |
| Bricks | 65.4 | 1.70 |
| Fine hexagons | 59.0 | 1.73 |
| Tire | 18.0 | 0.05 |
| Big waves | 66.0 | 50.00 |
| Lateral stripes | 93.8 | 75.00 |

The respective application patterns shown in Table 4 are patterns that can be applied using the adhesives according to Examples 1 and 2, and it was found from the ratio of the area of the "tire" pattern that an adhesive product that can cause damage to the paper can be formed with an application pattern of which the ratio of the application area is no smaller than 18%. In addition, it was also found from the same "tire" pattern that the adhesive layers of which the area occupied by the main adhesive blocks is no less than 0.05 sq. mm can be applied without failure and can cause damage on the paper. Furthermore, it was found that adjacent adhesive blocks can be applied independently even in application patterns having a high area ratio, such as "large grate" (93.7%) or "lateral stripes" (93.8%) of the adhesives shown in the examples. In addition, it was found for the occupied area that adhesive blocks on an area as large as 75 sq. mm can be applied in the case where the width of the film is set to 25 mm. Here, though concrete data is not shown, it is assumed from the results shown in Table 3 that application patterns such as "fine dots," "large grate" and "lateral stripes" are application patterns that can sufficiently cause damage to the paper of a white envelope.

What is claimed is:

1. An adhesive product comprising:
an adhesive layer having an acrylic adhesive and a base for supporting said adhesive on a winding spool and configured such that at least a paper article can be pasted to another member via said adhesive layer;
wherein said adhesive layer comprises multiple portions of said adhesive intermittently placed on a surface of said base and prearranged in a non-variable application pattern, wherein a thickness of said adhesive layer is 10 μm to 100 μm, said adhesive layer includes said multiple portions of said adhesive containing said acrylic adhesive and gap portions intervening between the multiple portions of said adhesive, and a ratio of said multiple portions of said adhesives to an application area is 18% to 94%;
wherein each of said multiple portions of said adhesive is formed so that an area of the bottom surface on which the adhesive portion is supported by the base is greater than an area of the top surface;
wherein said adhesive is transferable from the winding spool in the prearranged non-variable application pattern to a surface layer portion of a paper article or another member by a first pressing movement such that the top surfaces of the multiple portions of said adhesive contacts one of the paper article and another member, and said paper article and said another member can then be pasted together via said adhesive layer by a second pressing movement, and
wherein when a peeling movement is carried out in order to peel said another member from said paper article from a state where said paper article and said another member are pasted together, said paper article is ripped in the direction of the thickness producing a damaged paper phenomenon.

2. The adhesive product according to claim 1, wherein said paper article is high quality paper and the damaged paper phenomenon can be produced with the adhesive attached to the high quality paper.

3. The adhesive product according to claim 1, wherein said paper article is a white envelope and the damaged paper phenomenon can be produced with the adhesive attached to the white envelope.

4. The adhesive product according to claim 1, wherein said acrylic adhesive comprises a triblock copolymer represented by formula: A-B-A or formula: A-B-C wherein A, B and C indicate polymer blocks which are different from each other, A comprises alkyl methacrylate units, B is made of alkyl acrylate units and C is made of alkyl acrylate units or alkyl methacrylate units).

5. The adhesive product according to claim 1, wherein said acrylic adhesive is a diblock copolymer represented by the following general formula (I):

$$X—Y \qquad (I)$$

wherein X indicates a polymer block primarily comprising alkyl methacrylate units having an alkyl group with 1 to 4 carbon atoms or an alkyl group with a ring structure, and Y indicates a polymer block primarily comprising alkyl acrylate units having an alkyl group with 1 to 20 carbon atoms and/or alkyl methacrylate units having an alkyl group with 5 to 20 carbon atoms, a weight-average molecular weight (Mw) of the polymer block X is 1000 to 8000, and a ratio of the mass of the polymer block X to the mass of polymer block Y, a mass ratio of X/Y, is in a range of 1/99 to 10/90.

6. The adhesive product according to claim 5, wherein said polymer block X primarily comprises alkylmethacrylate units having an alkyl group with 1 to 4 carbon atoms and said polymer block Y primarily comprises alkyl acrylate units having an alkyl group with 1 to 20 carbon atoms.

7. The adhesive product according to claim 6, wherein a ratio (Mw/Mn) of the weight-average molecular weight (Mw) to the number-average molecular weight (Mn) of said polymer block X is no greater than 1.5.

8. The adhesive product according to claim 1, wherein said acrylic adhesive comprises a tackifier.

9. The adhesive product according to claim 1, wherein a thickness of said adhesive layer is set to 15 μm to 80 μm.

10. The adhesive product according to claim 1, wherein a thickness of said adhesive layer is set to 30 μm to 60 μm.

11. The adhesive product according to claim 1, wherein the ratio of said adhesive portions to the application area is 53% to 75%.

12. The adhesive product according to claim 1, wherein the gap portion provides openings on the sides of the adhesive layer throughout approximately the entirety of said adhesive layer.

13. The adhesive product according to claim 1, wherein said multiple adhesive portions comprises a number of adhesive blocks and the dimension of each of the adhesive blocks is 0.05 sq .mm. to 75 sq. mm.

14. The adhesive product according to claim 1, wherein said acrylic adhesive is a hot melt type adhesive.

15. The adhesive product according to claim 1, wherein the adhesive product is a pressure sensitive transferring adhesive tape.

16. A transferring instrument comprising the adhesive product according to claim 15.

17. The adhesive product according to claim 1, wherein the multiple portions of said adhesive intermittently placed on a surface of said base and the gap portions together form the application pattern.

18. The adhesive product according to claim 17, wherein the application pattern is repetitive and continuous.

19. The adhesive product according to claim 18, wherein said multiple portions of said adhesive intermittently placed on a surface of said base are one of dot blocks and grate blocks arranged to form a uniform pattern.

20. The adhesive product according to claim 18, wherein the application pattern formed is one of a ginko, brick, fine hexagon, tire, big wave, and lateral stripe pattern.

* * * * *